United States Patent
Yoshihara

(10) Patent No.: US 11,221,790 B2
(45) Date of Patent: Jan. 11, 2022

(54) STORAGE SYSTEM

(71) Applicant: HITACHI, LTD., Tokyo (JP)

(72) Inventor: Tomohiro Yoshihara, Tokyo (JP)

(73) Assignee: HITACHI LTD., Tokyo (JP)

(*) Notice: Subject to any disclaimer, the term of this patent is extended or adjusted under 35 U.S.C. 154(b) by 429 days.

(21) Appl. No.: 16/334,658

(22) PCT Filed: May 24, 2017

(86) PCT No.: PCT/JP2017/019304
§ 371 (c)(1),
(2) Date: Mar. 19, 2019

(87) PCT Pub. No.: WO2018/216124
PCT Pub. Date: Nov. 29, 2018

(65) Prior Publication Data
US 2021/0286547 A1 Sep. 16, 2021

(51) Int. Cl.
*G06F 3/06* (2006.01)
(52) U.S. Cl.
CPC ............ *G06F 3/0655* (2013.01); *G06F 3/061* (2013.01); *G06F 3/067* (2013.01); *G06F 3/0614* (2013.01); *G06F 3/0679* (2013.01); *G06F 3/0689* (2013.01)
(58) Field of Classification Search
CPC ........ G06F 3/0655; G06F 3/067; G06F 3/061; G06F 3/0689; G06F 3/0614; G06F 3/0679; G06F 11/10
USPC .......................................... 711/154, 162, 114
See application file for complete search history.

(56) References Cited

U.S. PATENT DOCUMENTS

| | | | |
|---|---|---|---|
| 6,434,683 B1 * | 8/2002 | West | G06F 3/0613 711/161 |
| 8,832,395 B1 * | 9/2014 | Watanabe | G06F 11/1076 711/161 |
| 2003/0051111 A1 * | 3/2003 | Nakano | G06F 11/2058 711/162 |

(Continued)

FOREIGN PATENT DOCUMENTS

| JP | 2009-104420 A | 5/2009 |
|---|---|---|
| JP | 2015-518186 A | 6/2015 |

OTHER PUBLICATIONS

International Search Report for PCT/JP2017/019304, dated Jun. 20, 2017.

*Primary Examiner* — Hashem Farrokh
(74) *Attorney, Agent, or Firm* — Volpe Koenig

(57) ABSTRACT

A plurality of storage drives, for managing data. includes: transmitting a first data update command which specifies a first address, and first new data to a first storage drive included in the plurality of storage drives; updating a sequence number of the first address managed in the first storage drive in response to the first data update command; transmitting a first redundant data update command which specifies a second address of old redundant data, data for updating the old redundant data, and the updated sequence number, to a second storage drive which stores the old redundant data associated with the first address and which is included in the plurality of storage drives; updating the old redundant data based on the data for updating the old redundant data; and updating a sequence number of the second address managed in the second storage drive according to the updated sequence number.

9 Claims, 16 Drawing Sheets

(56) References Cited

U.S. PATENT DOCUMENTS

| | | | |
|---|---|---|---|
| 2006/0224844 A1* | 10/2006 | Kano | G06F 12/0223 |
| | | | 711/162 |
| 2009/0106583 A1* | 4/2009 | Kawamura | G06F 11/1076 |
| | | | 714/6.13 |
| 2013/0290773 A1 | 10/2013 | Yoshihara | |
| 2014/0195722 A1* | 7/2014 | Tatara | G06F 3/065 |
| | | | 711/103 |

* cited by examiner

[FIG. 1]
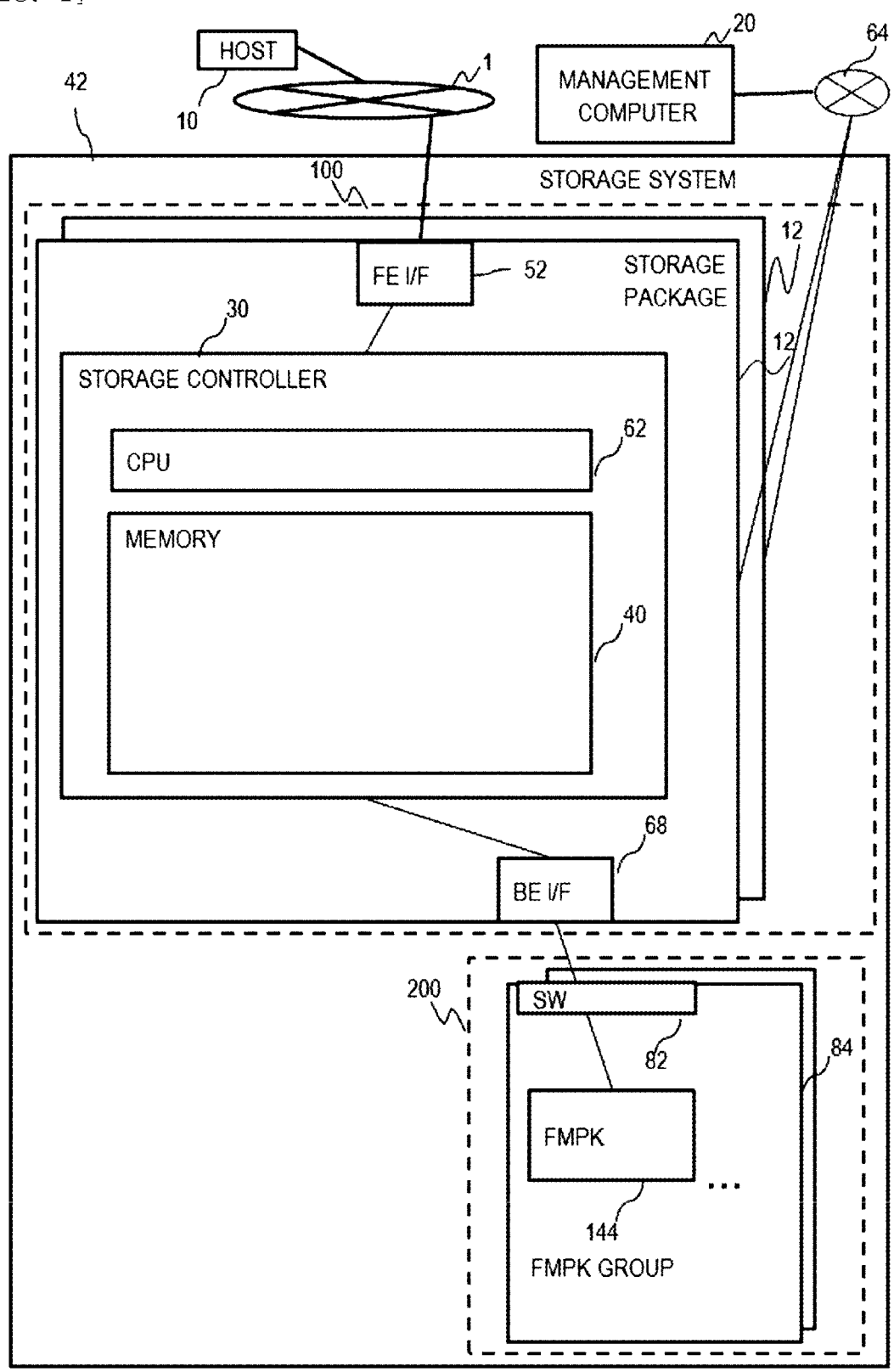

[FIG. 2]
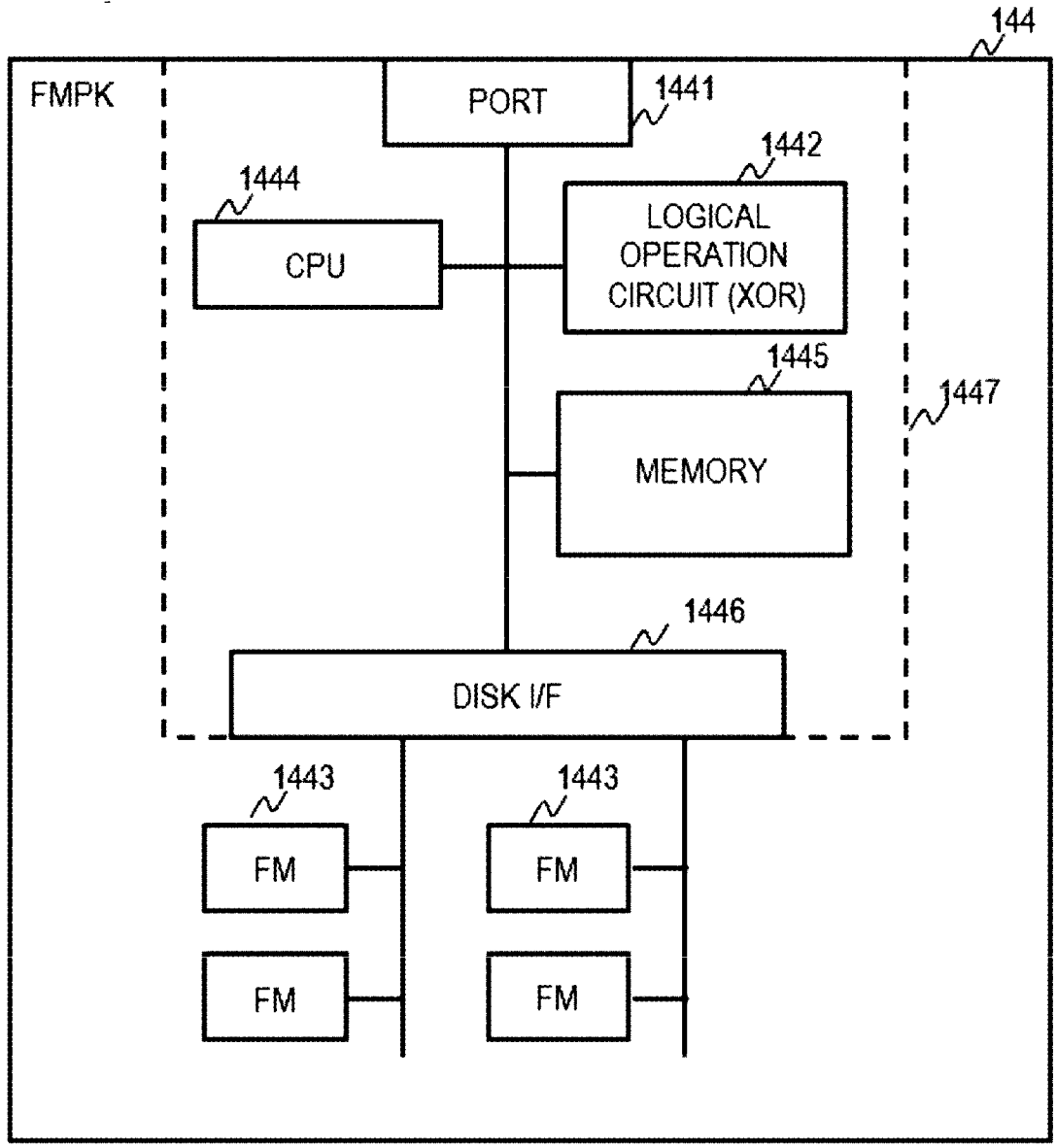
[FIG. 3]
| LOGICAL VOLUME ID (LUN) | FMPK ID | RAID LEVEL | XOR Enable |
|---|---|---|---|
| 0 | 0, 1, 2, 3 | 5(3D+1) | 1 |
| 1 | 4, 5, 6, 7 | 5(7D+1P) | 0 |
| ... | ... | ... | ... |
VOLUME MANAGEMENT TABLE

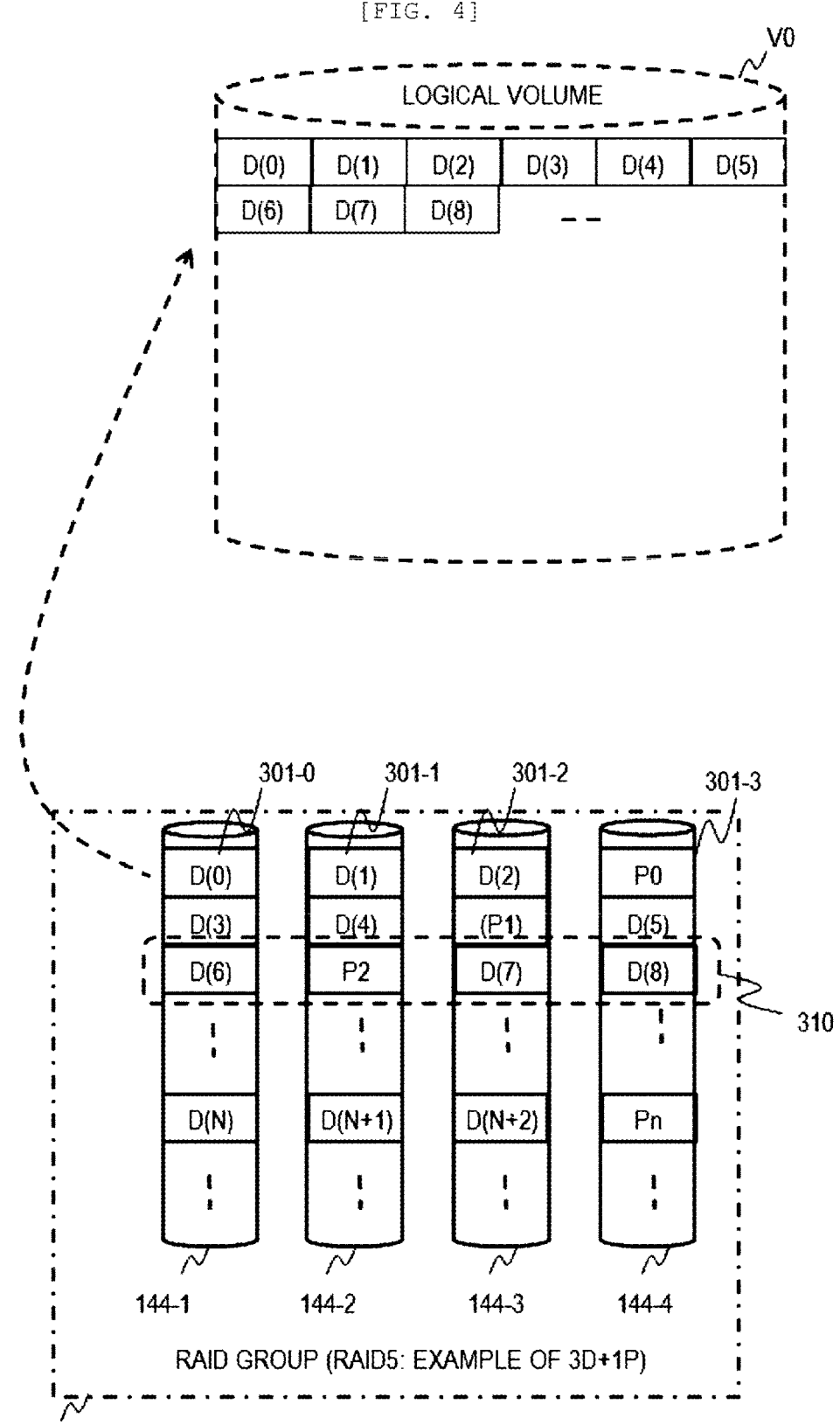

[FIG. 5]

LOGICAL ADDRESS MANAGEMENT INFORMATION TABLE (400)

| LBA (401) | OLD PA (402) | NEW PA (403) |
|---|---|---|
| 0 | P8 | P9 |
| 1 | P32 | P323 |
| ... | ... | ... |

[FIG. 6]

SEQUENCE NUMBER MANAGEMENT TABLE (500)

| LBA (501) | SEQ (0) (521) | SEQ (1) (522) | SEQ (2) (523) |
|---|---|---|---|
| 0 | NULL | NULL | 3 |
| 1 | 3 | 4 | 6 |
| 2 | NULL | 9 | NULL |
| ... | ... | ... | ... |

[FIG. 7]
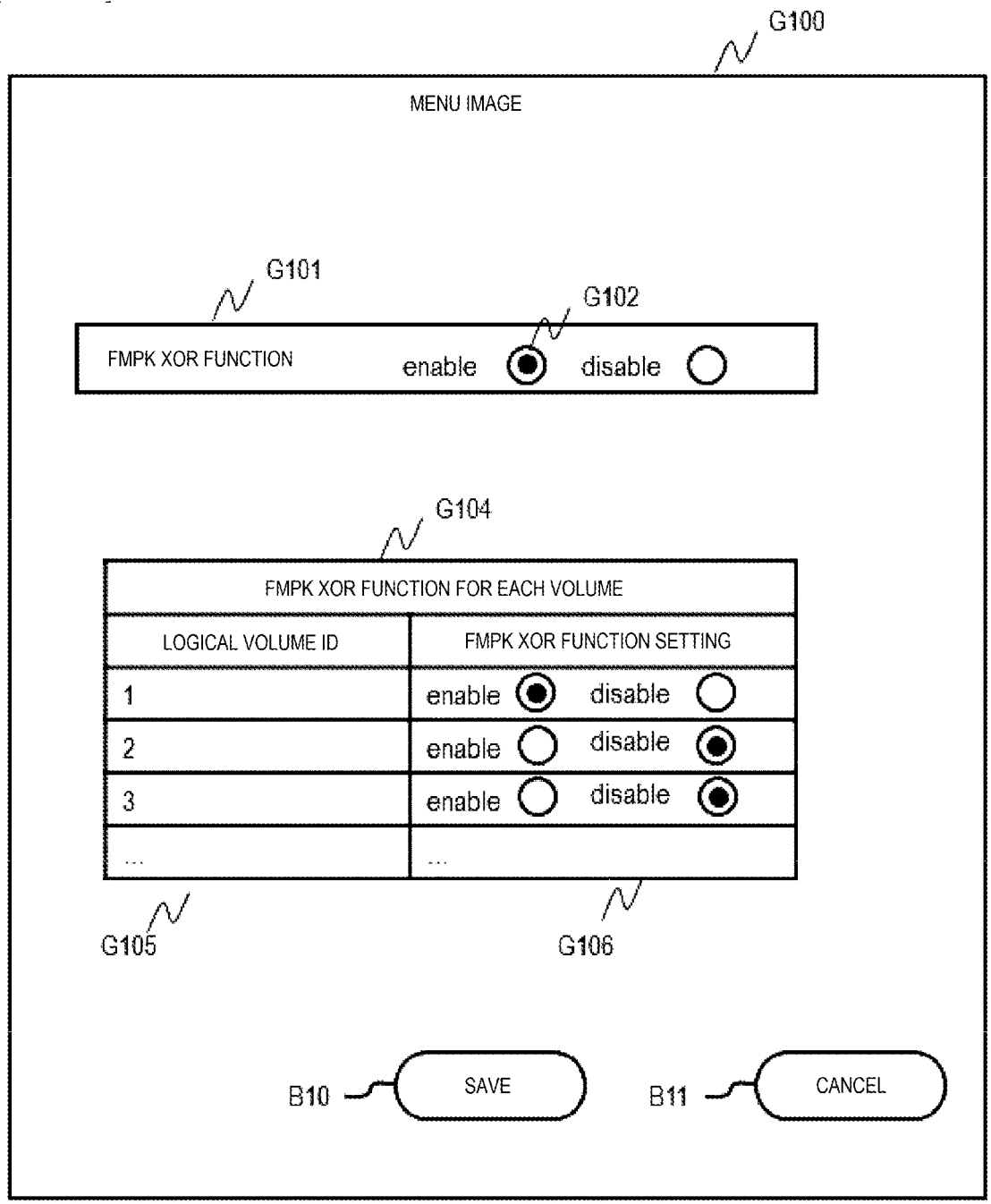

[FIG. 8]
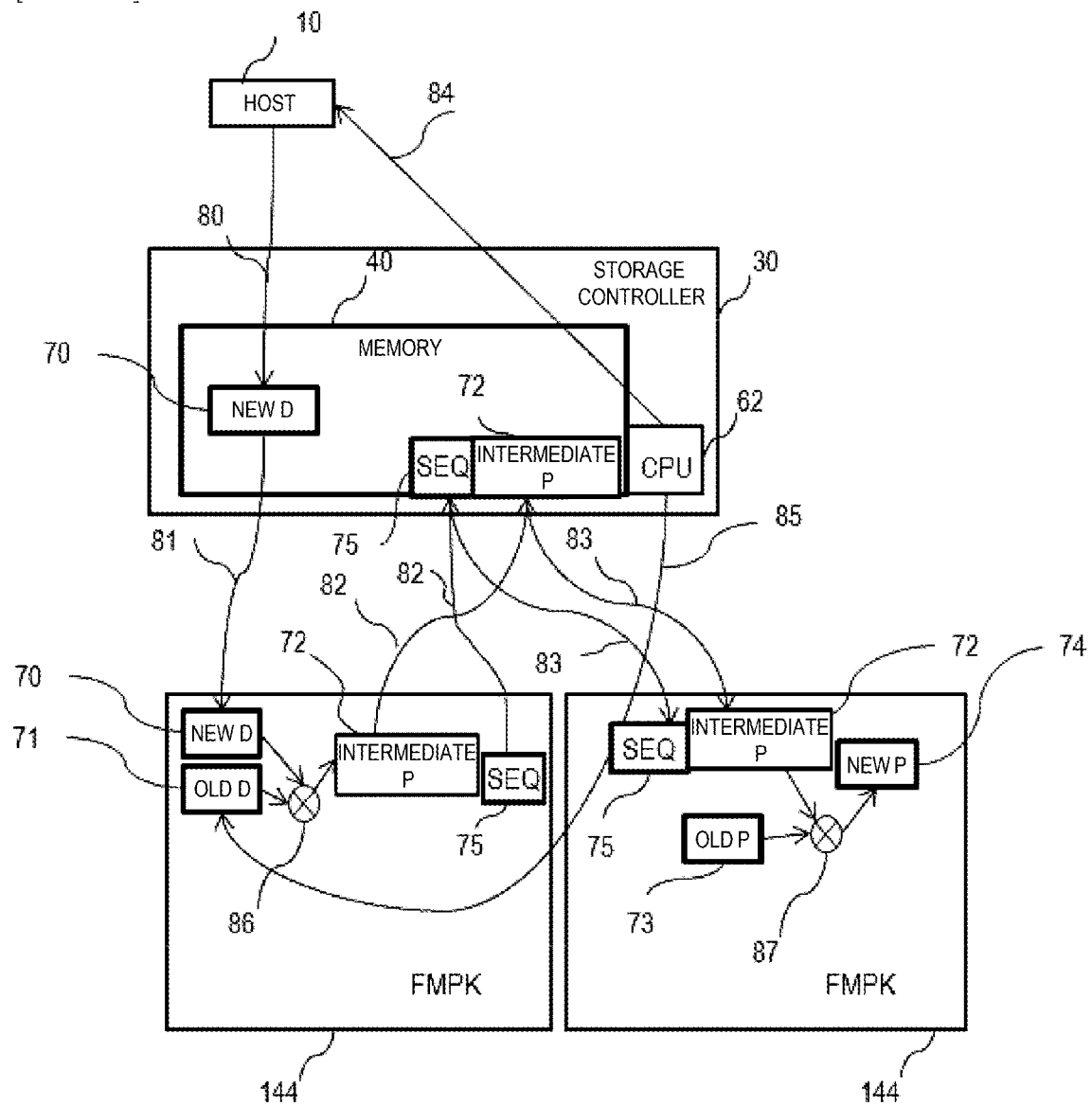

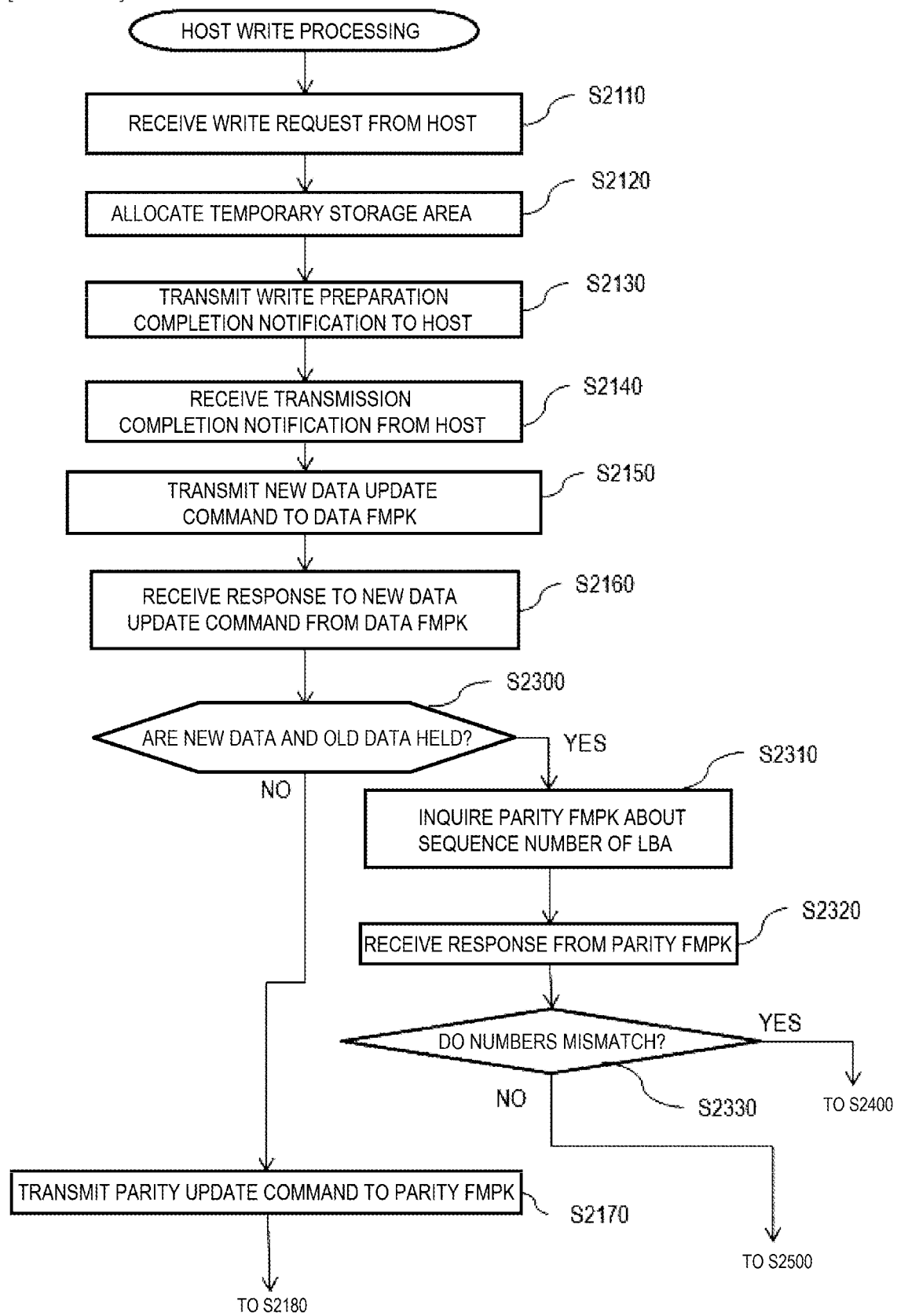
[FIG. 9A]

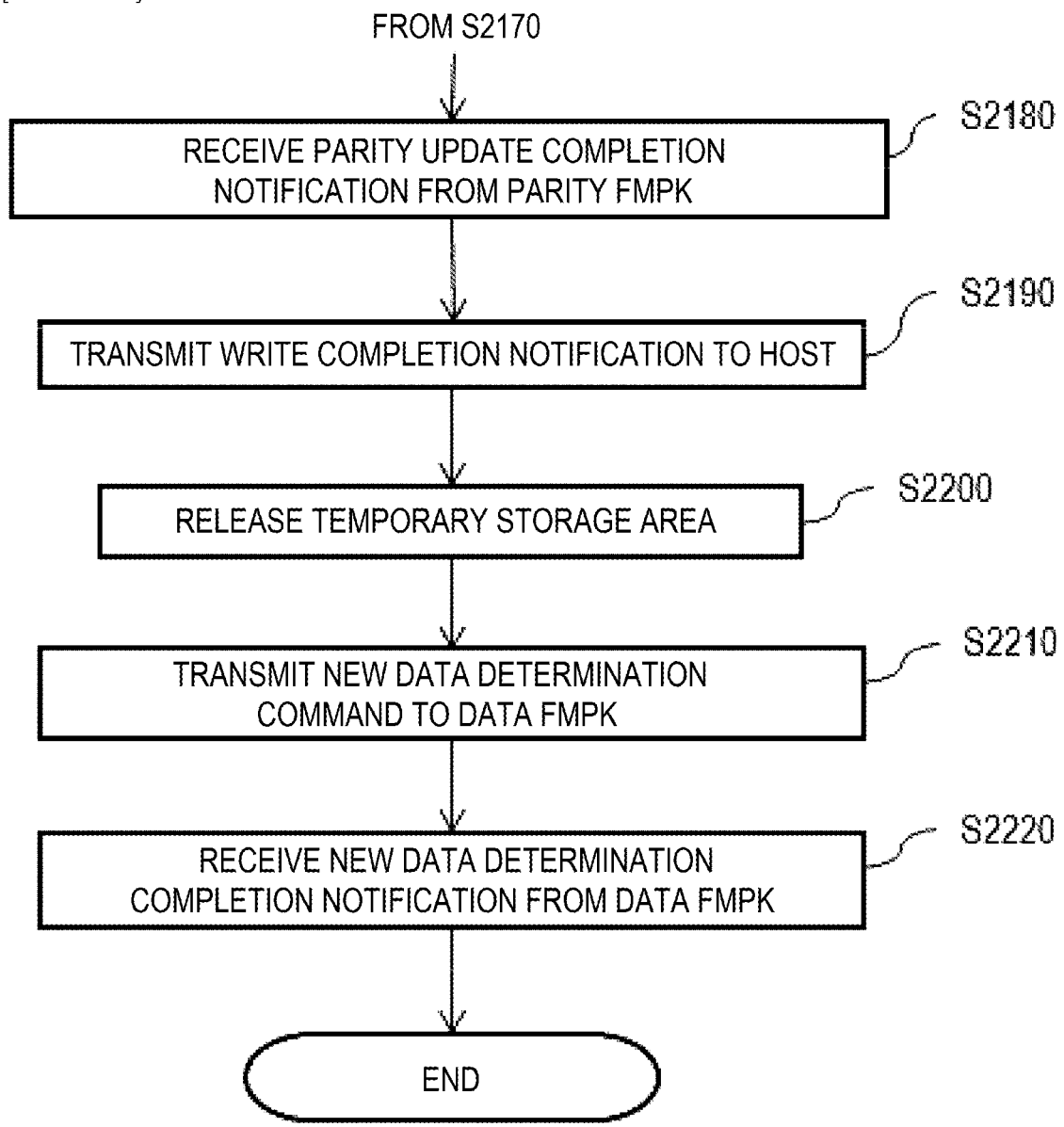

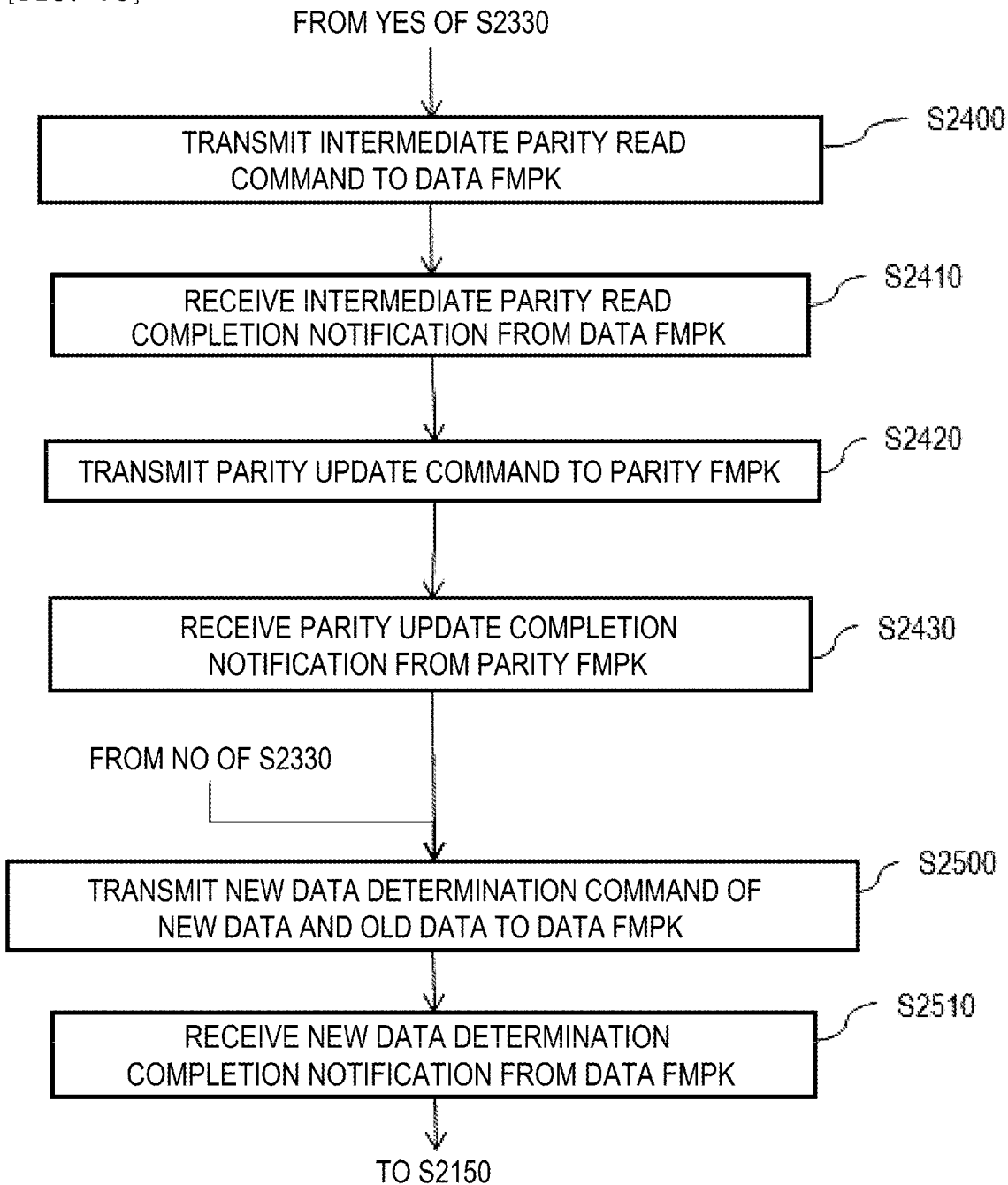

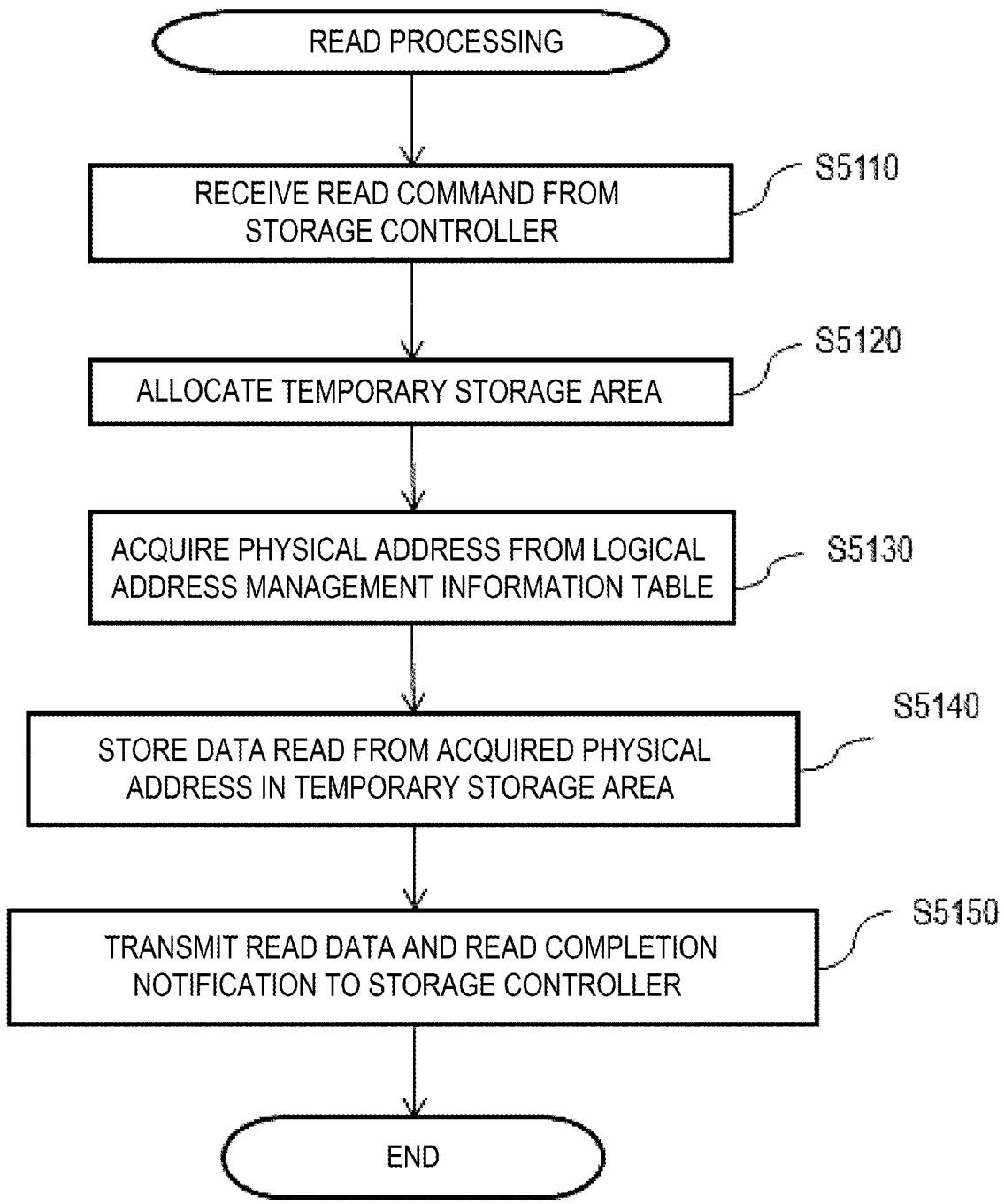
[FIG. 10]

[FIG. 11]
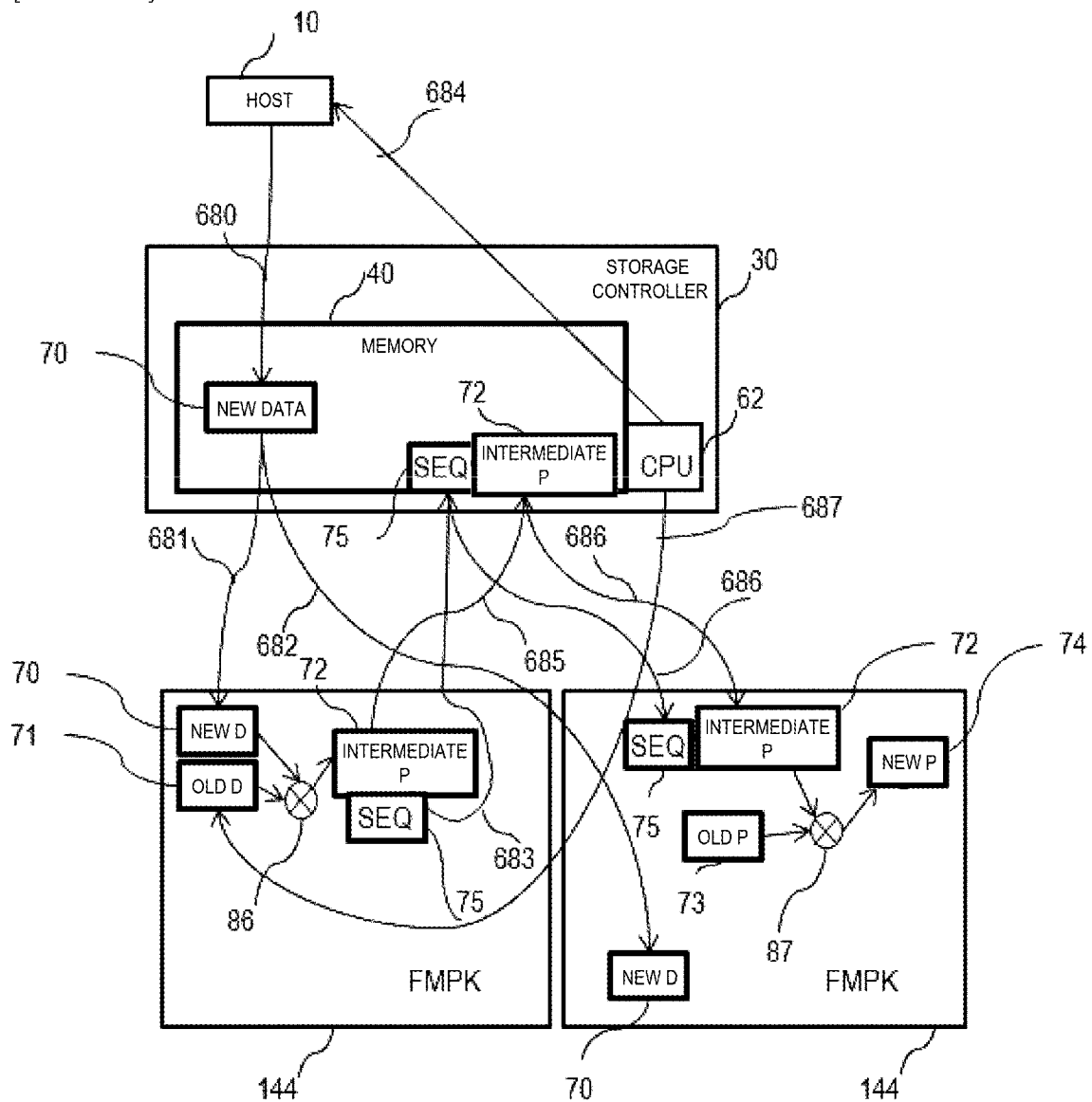

[FIG. 12A]
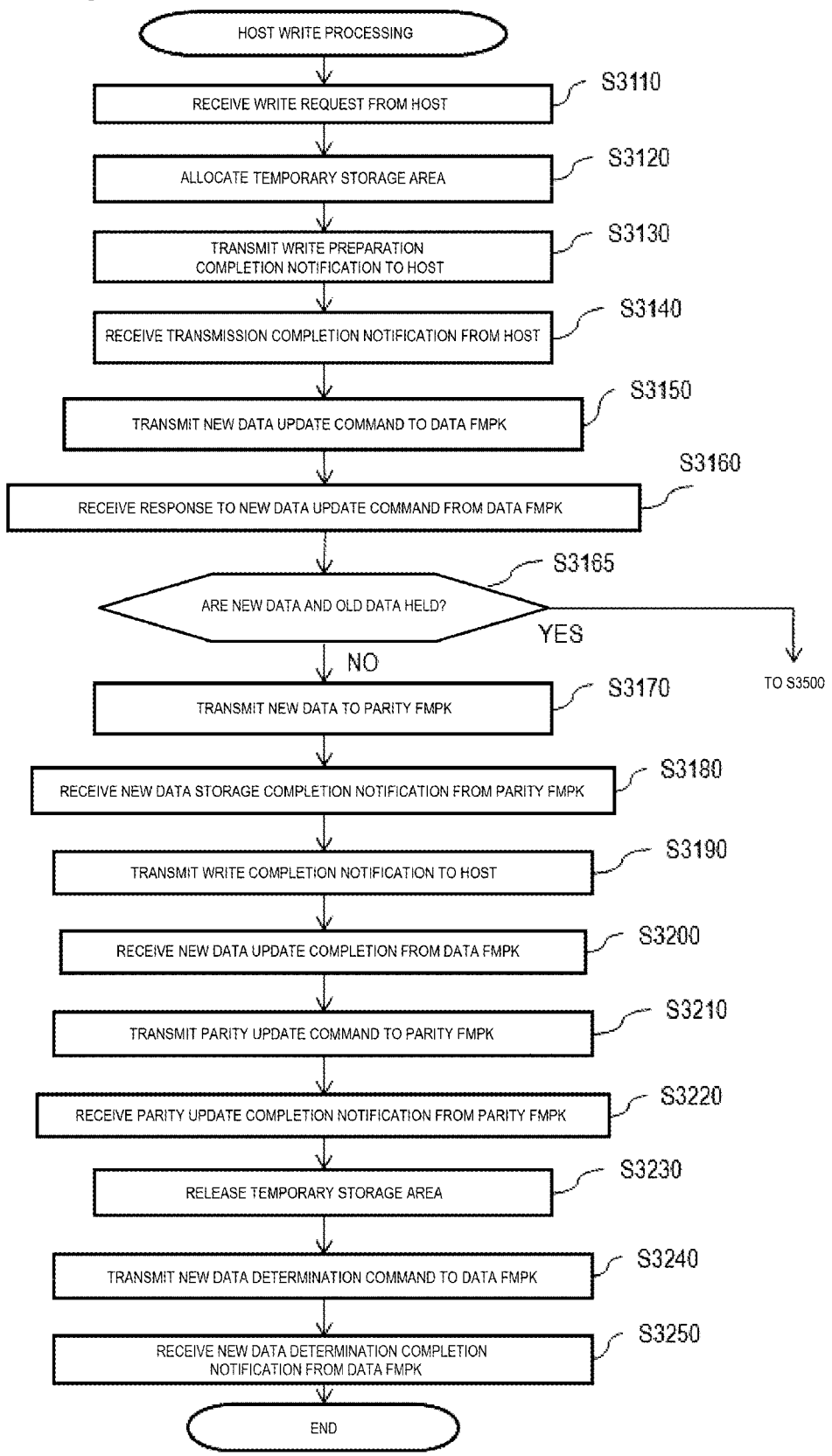

[FIG. 12B]
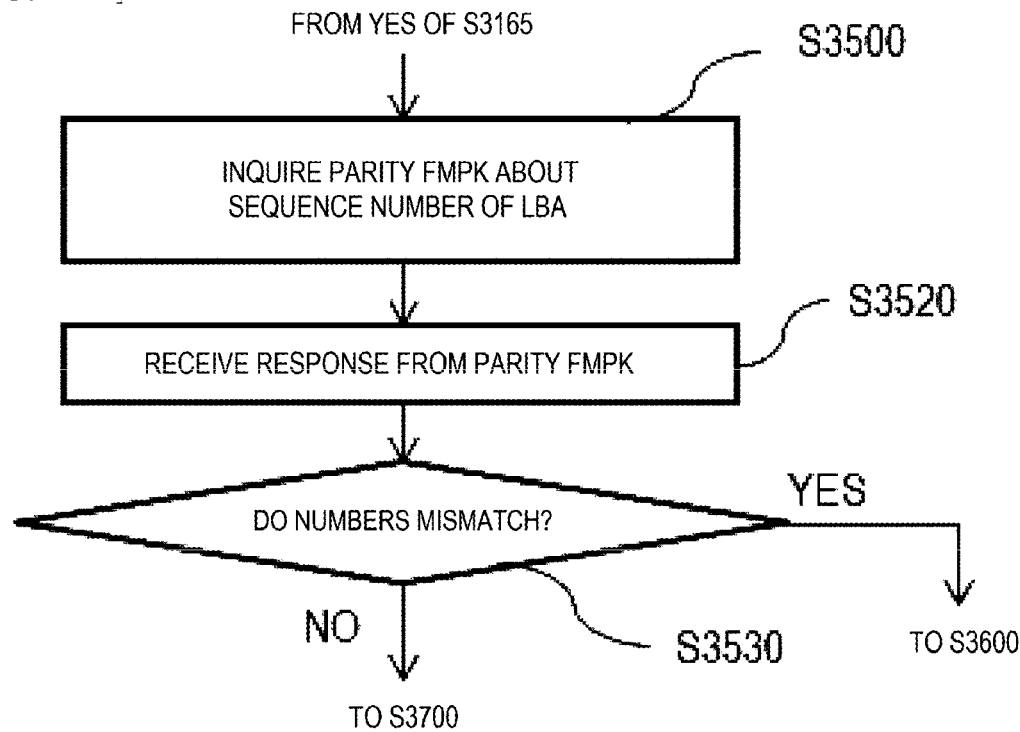
[FIG. 12C]
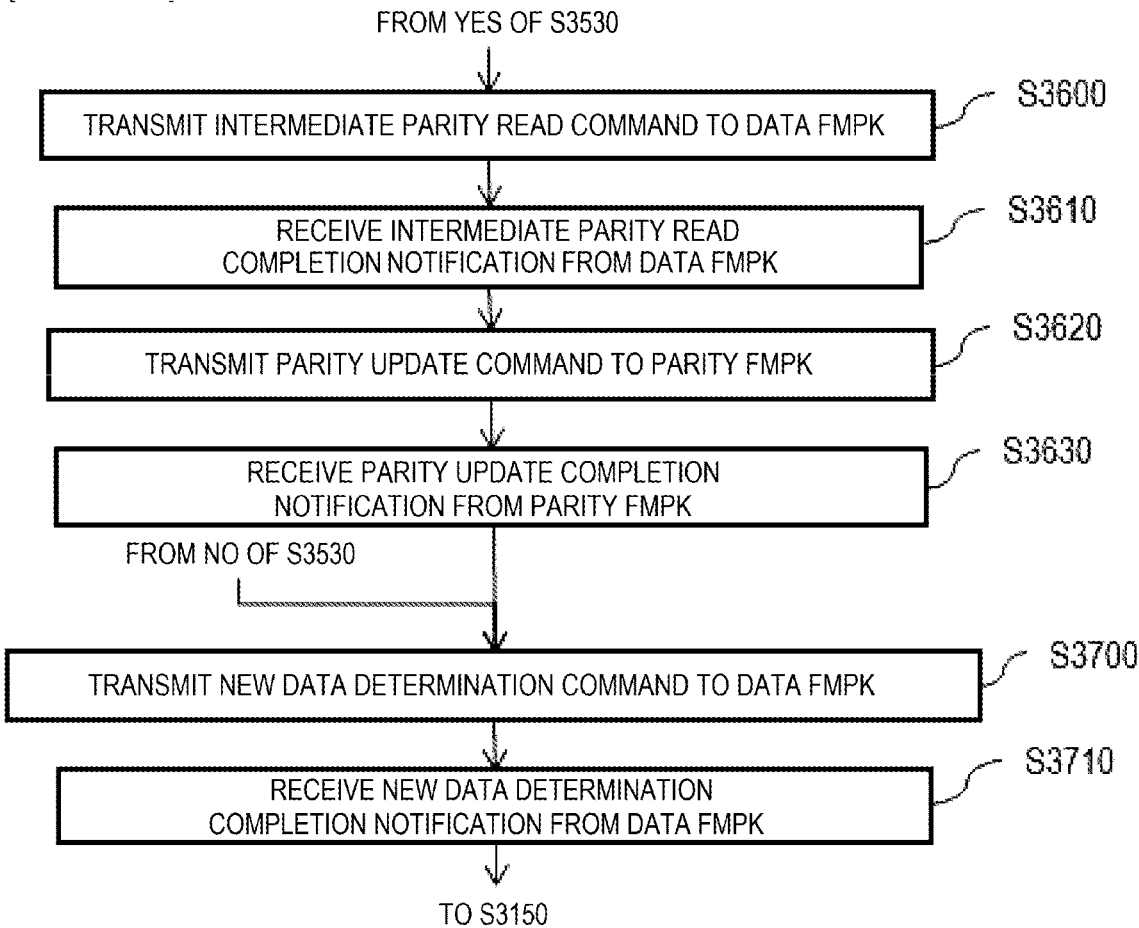

[FIG. 13]
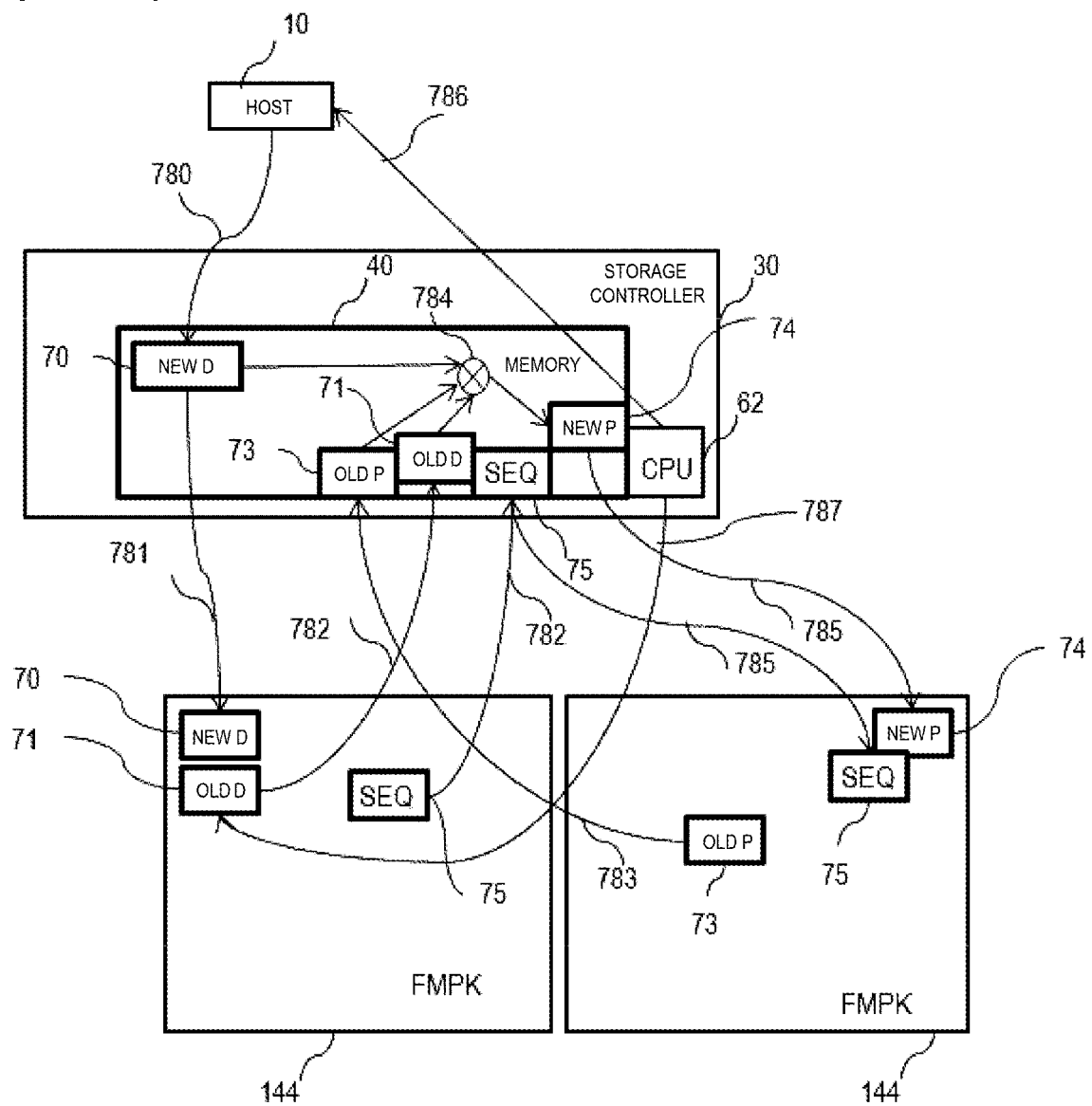

[FIG. 14A]
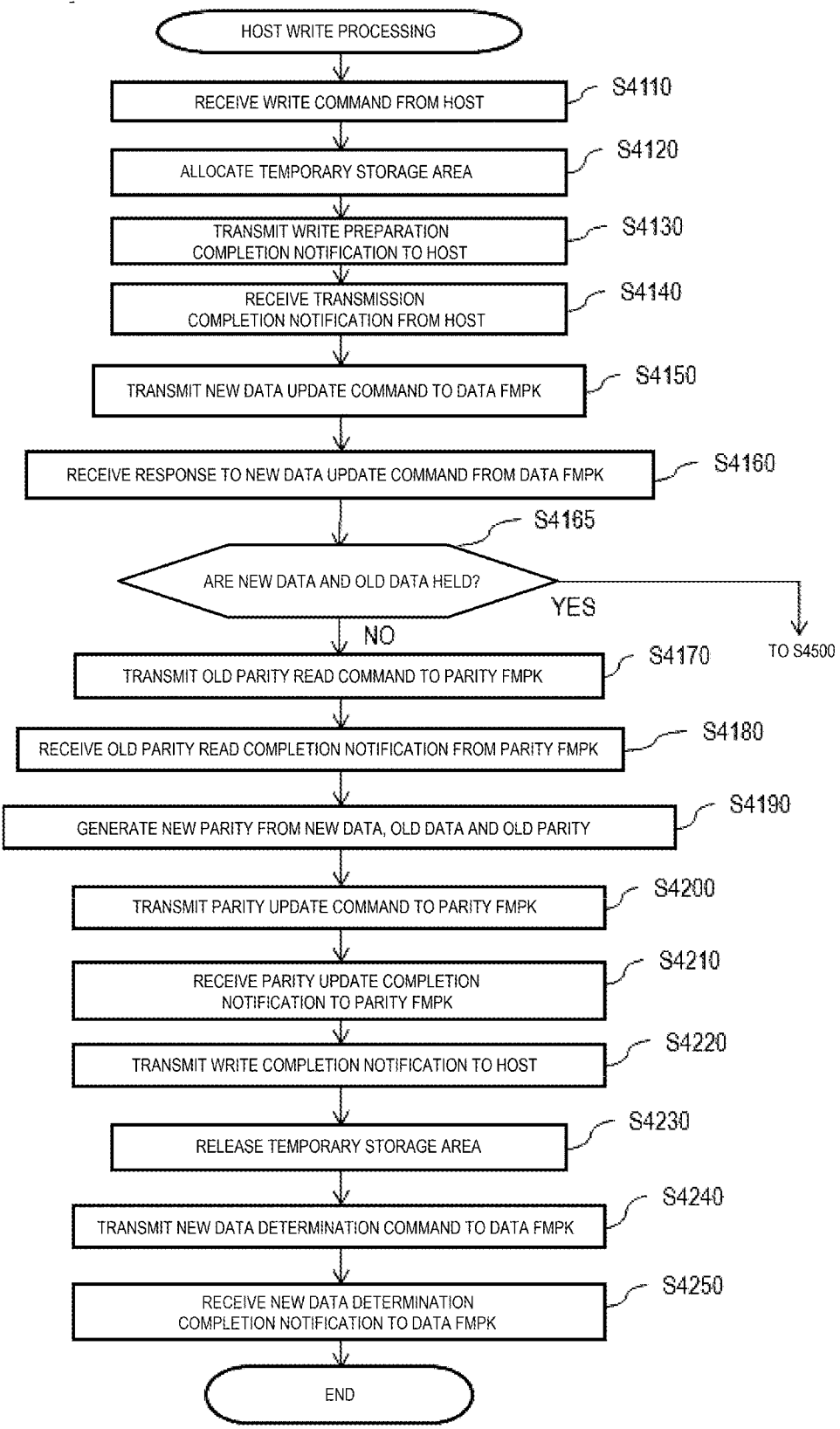

[FIG. 14B]
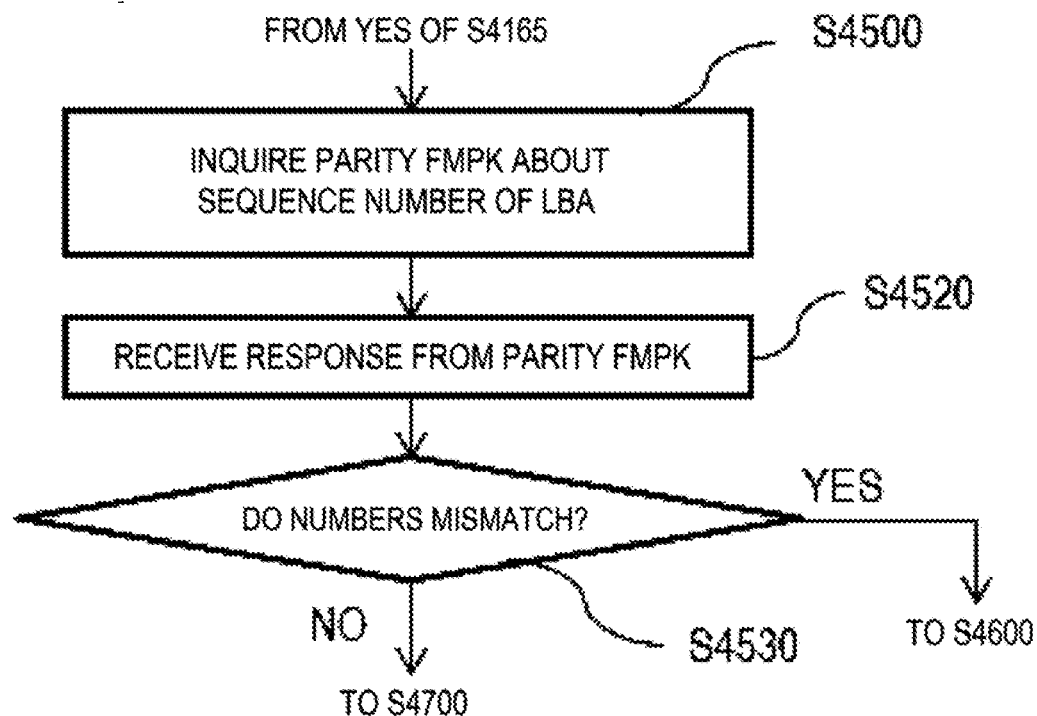
[FIG. 14C]
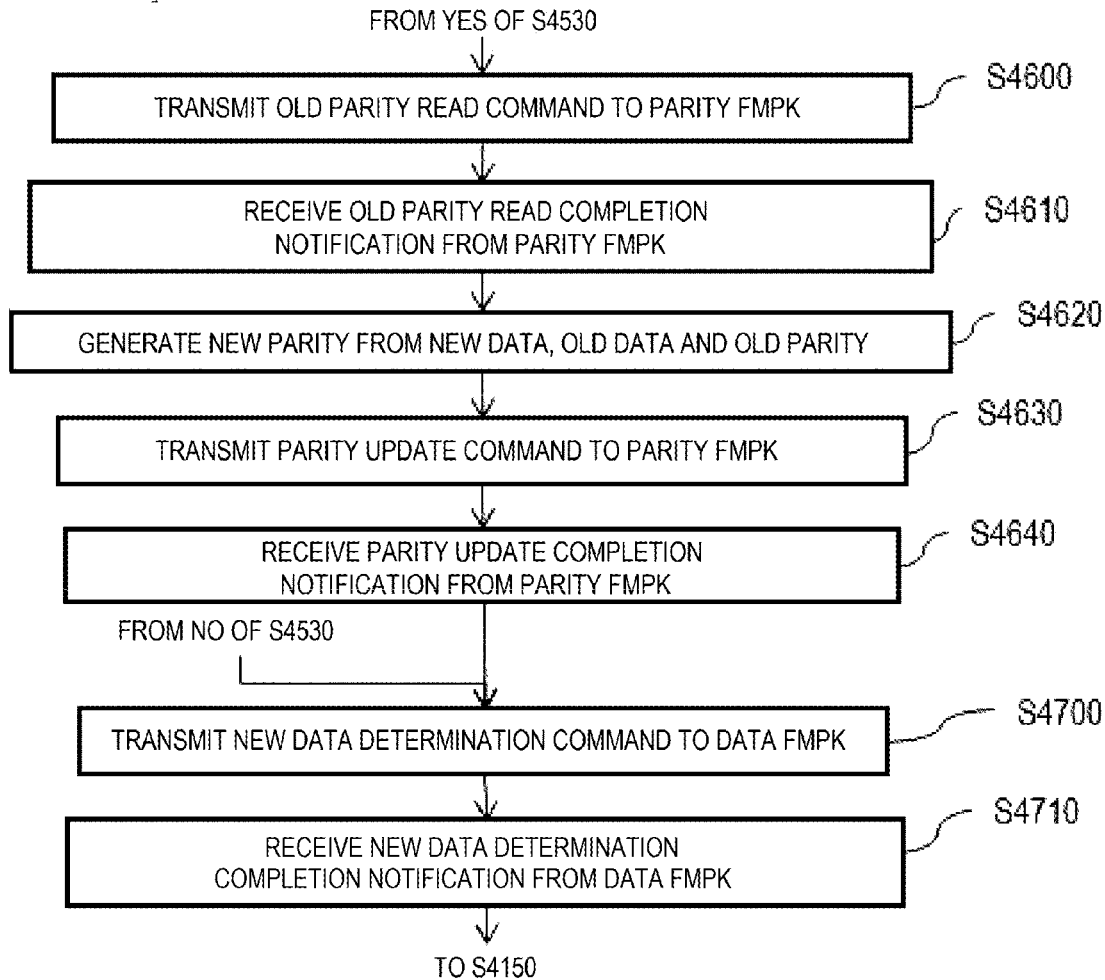

STORAGE SYSTEM

TECHNICAL FIELD

The present invention relates to a technique of generating redundant data in a storage system.

BACKGROUND ART

Generally, the calculation of a parity is performed by a controller (storage controller) mounted in a storage system. However, since a processing load of the storage controller is increased, there is a technique of providing a parity operating function to a storage drive and offloading an operating load of the parity from the storage controller to the storage drive.

For example, Patent Literature 1 discloses a configuration in which a storage drive has a parity generation function. A storage controller transmits new data to the storage drive which stores the old data. The storage controller receives an intermediate parity generated by the storage drive. The storage controller transmits the received intermediate parity to the storage drive which stores a non-updated parity corresponding to the new data. The storage controller causes the storage drive which stores the non-updated parity to generate updated parity based on the intermediate parity and the non-updated parity stored in the storage drive, and store the updated parity.

CITATION LIST

Patent Literature

Patent Literature 1: US Patent Application Publication 2013/0290773

SUMMARY OF INVENTION

Technical Problem

Generally, when writing to the storage drive from the storage controller is instructed, write data and information for managing a storage location of the write data are duplicated by the storage controller in preparation for a failure of the storage controller during a series of processing for writing.

Further, an update of the write data on the storage drive also requires updating parity data of a corresponding storage drive. Therefore, it is necessary to manage the write data and the parity data on the storage drive and the controller both in a state before updating or in a state after updating. The storage controller also duplicates and holds this state management information in preparation for the failure.

The technique described in Patent Literature 1 also requires duplication of management information of the new data (write data) and duplication of information for managing the state before and after the updating of the storage drive.

Solution to Problem

A storage system according to an aspect of the present disclosure includes a plurality of storage drives and a controller, wherein the controller receives, from a host, a first write request which specifies a first address and first new data associated with the first write request, and transmits a first data update command which specifies a second address and the first new data to a first storage drive included in the plurality of storage drives; the first storage drive updates a managed sequence number of the second address in response to the first data update command, and transmits the updated sequence number to the controller; the controller transmits a first redundant data update command which specifies a third address of old redundant data, data for updating the old redundant data, and the updated sequence number to a second storage drive which stores the old redundant data associated with the second address and which is included in the plurality of storage drives; and the second storage drive updates the old redundant data based on the data for updating the old redundant data and updates the managed sequence number of the third address according to the updated sequence number.

Advantageous Effect

According to one embodiment of the invention, it is possible to offer a processing load relating to parity data generation and data storage processing to the storage drive while maintaining the reliability and the availability of the system.

BRIEF DESCRIPTION OF DRAWINGS

FIG. 1 shows a configuration diagram of a storage system according to an embodiment.

FIG. 2 shows a configuration diagram of a flash memory package.

FIG. 3 shows a configuration of a volume management table.

FIG. 4 shows a conceptual diagram showing a relationship between a storage space on a logical volume and a storage area in a RAID group.

FIG. 5 shows a configuration of a logical address management information table in the flash memory package.

FIG. 6 shows a configuration of a sequence number management table in the flash memory package.

FIG. 7 shows an example of a setting window of an XOR calculation function.

FIG. 8 shows a schematic diagram of a host write processing according to a first embodiment.

FIG. 9A shows a flow of the host write processing according to the first embodiment.

FIG. 9B shows a flow of the host write processing according to the first embodiment.

FIG. 9C shows a flow of the host write processing according to the first embodiment.

FIG. 10 shows a flow of a read processing from the flash memory package according to the first embodiment.

FIG. 11 shows a schematic diagram of a host write processing according to a second embodiment.

FIG. 12A shows a flow of the host write processing according to the second embodiment.

FIG. 12B shows a flow of the host write processing according to the second embodiment.

FIG. 12C shows a flow of the host write processing according to the second embodiment.

FIG. 13 shows a schematic diagram of a host write processing according to a third embodiment.

FIG. 14A shows a flow of the host write processing according to the third embodiment.

FIG. 14B shows a flow of the host write processing according to the third embodiment.

FIG. 14C shows a flow of the host write processing according to the third embodiment.

DESCRIPTION OF EMBODIMENTS

Hereinafter, a storage system according to the embodiment will be described with reference to the drawings. It should be noted that the invention is not limited to the embodiments described below.

First Embodiment

FIG. 1 shows a configuration of a storage system 42 according to one embodiment. The storage system 42 includes a controller 100 and a storage unit 200 connected to the controller.

The storage unit 200 includes a plurality of final storage drives for storing write data from a host device such as a host computer. The storage system 42 according to the present embodiment uses a flash memory package (FMPK) 144 as a final storage device of data. The FMPK is a storage drive using a flash memory which is a nonvolatile semiconductor memory, and is, for example, a solid state drive (SSD). Instead of the FMPK, a storage drive using a nonvolatile memory different from an FM such as a magnetic disk drive may be used.

The controller 100 manages a plurality of FMPKs 144 as one or a plurality of redundant arrays of inexpensive disks (RAID) groups 145 (see FIG. 3).

One or more host computers 10 and a management computer 20 are connected to the controller 100. The controller 100 and the host computer 10 are connected via a storage area network (SAN) 1 formed by using, for example, a fiber channel. The controller 100 and the management computer 20 are connected via a network 64 formed by using, for example, Ethernet.

The storage system 42 receives an instruction of data read/write (I/O processing) from the host computer 10 in a front end interface (FE I/F) 52. A CPU 62 of a storage controller 30 included in a storage package 12 performs the I/O processing according to a storage control program stored in a memory 40. The storage packages 12 are redundant in preparation for a failure, and the redundant storage packages 12 are connected with each other via a switch (SW) 64.

The memory 40 includes an area for a cache memory (CM) which temporarily stores I/O target data for the storage drive, and an area for a shared memory (SM) which stores various management information of the storage system 42. Data of the CM and data of the SM are redundant to the CM and the SM in the memory 40 in a plurality of storage packages 12 in preparation for the failure. The memory 40 further includes a temporary storage area of data that is not redundant in the plurality of storage packages 12 (storage controller 30).

In the present embodiment, the redundancy processing is reduced between the storage controllers in a write processing. For example, write data, parity data (also simply referred to as "parity"), and redundant management information of the write data and the parity data in the write processing are not necessary in a plurality of storage controllers. In the present embodiment, the write performance of the storage controller is improved by using the temporary storage area of data that is not redundant in the storage controller, and the redundancy of the write data (parity generation) by the plurality of FMPKs. The memory 40 is generally composed of a volatile memory such as a DRAM or an SRAM, but a nonvolatile memory may be used.

A back end interface (BE I/F) 68 and the memory 40 are mutually accessible via the CPU 62. The BE I/F 68 is connected to the FMPK 144 via an SW 82. After receiving an I/O processing request from the host computer 10, the CPU 62 performs data read and write on the FMPK 144 which stores the target data. A plurality of FMPK groups 84 each composed of the plurality of FMPKs 144 may be defined.

A configuration of the FMPK 144 will be described with reference to FIG. 2. The FMPK 144 includes an FM controller 1447 and a plurality of FM chips 1443. The FM controller 1447 includes a port 1441, a logical operation circuit (XOR in the drawing) 1442, a CPU 1444, a memory 1445, and a disk interface (DISK I/F in the drawing) 1446.

The FM chip 1443 is a nonvolatile memory chip, for example, a NAND flash memory chip. As is well known, the flash memory performs data read and write in units of pages and performs data erasing in units of blocks that are a set of a plurality of pages. It is not possible to overwrite the page that was written once, so it is necessary to erase the data of the block including the page in order to perform data write again on the page that was written once.

The FMPK 144 does not directly provide a physical storage area of the FM 1443 to the storage controller 30 to which the FMPK 144 is connected, but provides a logical storage space. The logical storage space is composed of an area having a predetermined size, called a plurality of logical pages. When receiving a data write request to the logical pages from the CPU 62, the FMPK 144 allocates a physical storage area (physical page) of the FM 1443 to the logical page and stores the data.

When the data write request (that is, overwrite) to the logical page is received, the FMPK 144 allocates another physical page to the logical page, and stores the data in another physical page. A physical page, in which data before overwriting is stored, is managed as an invalid page, and the data is erased in a subsequent reclamation processing.

The memory 1445 stores a table for managing a relationship between the logical page and the physical page. Generally, the memory 1445 is a volatile memory, but may be a nonvolatile memory.

Next, a relationship between a logical volume and a RAID group, which is composed of the storage system 42 according to the present embodiment, will be described. The storage system 42 forms one RAID group based on a plurality of (for example, four) FMPKs 144.

When a failure occurs in one FMPK 144 and no data can be accessed, the storage system 42 uses data in a remaining FMPK 144 to recover the data stored in the failed FMPK 144. Further, the storage system 42 provides a storage area of the RAID group as the logical volume to the host device.

The storage controller 30 manages a correspondence relationship between the logical volume and the FMPK 144 in a volume management table 300. The volume management table 300 is stored in an SM 132. The volume management table 300 includes a logical volume ID column 301, an FMPK ID column 302, a RAID level column 303, and an XOR enable bit column 304.

The logical volume ID column 301 indicates an ID of the logical volume defined in the storage system 42. The FMPK ID column 302 indicates an ID of the FMPK 144 constituting the RAID group associated with the logical volume. The RAID level column 303 indicates a level of the RAID group. The storage system 42 according to the present embodiment associates a storage area of one RAID group with one logical volume. Details of the XOR Enable will be described below.

A relationship between a storage space on the logical volume and a storage area in the RAID group will be described with reference to FIG. 4. The storage controller 30 divides the storage space on the logical volume V0 into a plurality of fixed size storage areas called stripes, and associates them with a storage area of a RAID group 145.

In FIG. 4, boxes indicated by D(0) and D(1) in the logical volume V0 represent stripes, and the stripe size is, for example, 64 KB, 256 KB, or 512 KB. The number in parentheses attached to each stripe is called "stripe number".

In FIG. 4, elements 144-1 to 144-4 represent storage spaces provided by the FMPKs 144 to the storage controller 30. A stripe group on the logical volume V0 is not continuously associated with only the storage space of one particular FMPK 144. The stripes are scattered and associated with the storage spaces (144-1 to 144-4) of the plurality of FMPKs 144 constituting the RAID group 145.

The stripe which stores the parity in the RAID group 145 is not associated with the storage area on the logical volume V0. In FIG. 4, boxes indicated by P0 to Pn represent stripes which store the parity. In this specification, the stripe which stores the parity is called "parity stripe". The stripe which stores the data is called "data stripe".

Data stored in the parity stripe is generated using data stored in the data stripe. FIG. 4 shows the RAID group 145 of RAID 5 (3D+1P) as an example. The parity stored in one parity stripe is the data stripe that is present in the FMPK 144 different from the FMPK 144 in which the parity stripe is present, and is generated from the data stripe which is present at the same address as an address in the FMPK 144 of the parity stripe.

For example, a parity stripe P2 is located in a third stripe from a top on the storage space of the FMPK 144-2. The data stripe necessary for generating the parity stored in the parity stripe P2 is a third data stripe D(6), D(7), and D(8) in the FMPK 144-1, 144-3, and 144-4 constituting the RAID group 145.

The parity stripe P2 stores an exclusive OR (XOR) of the data stored in the data stripes D6, D7, and D8. Hereinafter, a set of a parity stripe and data stripes used to generate the parity stored in the parity stripe will be referred to as a "stripe group". FIG. 4 shows, by way of example, one stripe group with a number 310.

The FMPK which stores the data and the FMPK which stores the parity are different depending on the stripe group. In the outline of the embodiment and in the flow explanation, the FMPK which stores the target data is referred to as a data FMPK, and the FMPK which stores the parity corresponding to the target data is referred to as a parity FMPK.

The storage area on the logical volume V0 and the storage area within the RAID group 145 are associated with each other based on the above rule. Therefore, the storage controller 30 can identify the stripes in the RAID group 145, to which an access target area on the logical volume V0 from the host computer 10 is associated, with relatively simple calculation. Since this is a method which is performed in a well-known storage device adopting a RAID function, the detailed explanation will be omitted here.

With reference to FIG. 5 and FIG. 6, the management information held and used by each FMPK 144 will be described. FIG. 5 shows a configuration example of a logical address management information table 400, and FIG. 6 shows a configuration example of a sequence number management table 500.

The FMPK 144 provides the logical storage space (hereinafter referred to as a logical address space) to an external device to which the FMPK 144 is connected, and permits an access (read, write, etc.) from the CPU 62 to the logical address space. This logical address space is different from the address space of the storage area of the FM 1443.

When the FMPK 144 receives a write request which specifies an area on the logical address space from the CPU 62, an unused area (for example, an unused physical page) of the FM 1443 is allocated to the area. The FMPK 144 records and manages a correspondence relationship between the area on the logical address space and the storage area on the FM 1443 allocated to the area in the logical address management information table 400.

As shown in FIG. 5, the logical address management information table 400 includes an LBA column 401, an OLD PA column 402, and a NEW PA column 403. The LBA column 401 indicates an address on the logical address space provided to the storage controller 30.

The OLD PA column 402 indicates a pointer to data (or parity) stored in the address indicated by the LBA column 401, that is, an address (referred to as a physical address) on the FM 1443 associated with the address indicated by the LBA column 401. The NEW PA column 403 indicates the physical address on the FM 1443 which stores the new data when new data (new data) is received for the address indicated by the LBA column 401.

In the description of the present embodiment, a unit of the storage area managed by the logical address management information table 400 is one sector. In another example, the unit of the storage area managed by the logical address management information table 400 may be an area having a size different from that of one sector, for example, a page which is a minimum read/write unit of the FM 1443.

FIG. 6 shows an example of a sequence number management table 500 for RAID 5 (3D+1P). The sequence number management table 500 includes an LBA column 501 and a section 502 including a plurality of columns 521, 522, and 523. The LBA column 501 indicates an address on the logical address space provided to the storage controller 30.

In this example, a unit of the address indicated by the LBA column 501 is the same as that of the LBA column 401. In this example, a logical address (LBA) of the stripe is common in one stripe group, but the logical address (LBA) of the stripe may be different in one stripe.

The section 502 has the same number of columns as the number of data stripes in the stripe group. Each of the columns 521, 522, and 523 indicates a sequence number of the data stripe in the stripe group. The sequence number indicates a generation of data. The columns 521, 522, and 533 respectively indicate the sequence numbers of data stripes of numbers 0, 1, and 2 in the stripe group.

In each record, the LBA column 501 indicates the address of the parity stripe or the address of the data stripe. In the record of the parity stripe, the columns 521, 522, and 523 respectively indicate the sequence numbers of the data stripes of the same stripe group. In the record of the data stripe, a corresponding column of the section 502 indicates the sequence number thereof, and another column indicates a predetermined invalid value (NULL value).

The data stripe number in the stripe group may be defined in any manner as long as each data stripe can be identified in the stripe group. The data stripe number is based on, for example, an order of the FMPKs 144 in the RAID group. For example, in FIG. 4, the order of the FMPKs 144-1, 144-2, 144-3, and 144-4 is defined. The order of the data stripe numbers matches the order of the FMPKs 144-1, 144-2, 144-3, and 144-4 except for the parity stripes.

For example, when the parity stripe is present in the FMPK 144-1, the data stripes of the FMPKs 144-2, 144-3, and 144-4 have numbers 0, 1, and 2 respectively. When the parity stripe is present in the FMPK 144-3, the data stripes of the FMPKs 144-1, 144-2, and 144-4 have numbers 0, 1 and 2, respectively.

A relationship between the parity stripe and the data stripe will be described with the stripe 310 of FIG. 4 as an example. The parity data stored in the parity stripe P2 is Generated by the XOR of the data stripes D(6), D(7), and D(8). As described later, in the present embodiment, the data FMPK generates an intermediate parity, increments a held sequence number, and transmits the intermediate parity and the new sequence number to the parity FMPK which stores the parity. The parity FMPK generates a new (updated) parity from the intermediate parity and the old (non-updated) parity, and stores the new parity together with the sequence number.

Therefore, when the LBA column 501 indicates the LBA which stores the data of the parity stripe, the record stores the sequence numbers of the data stripes D(6), D(7), and D(8) respectively.

Next, the setting of a parity operating function of the FMPK 144 will be described. The management computer 20 displays a menu image for setting the parity operating function of the FMPK 144 on a display device and causes an administrator to set the parity operating function of the FMPK 144. FIG. 7 shows an example of a menu window. A menu window G100 shows an FMPK setting section G101, a logical volume setting section G104, a save button B10, and a cancel button B11.

The FMPK setting section G101 shows a GUI for inputting enable or disable of an XOR calculation function of the FMPK 144 and including a radio button G102. The FMPK setting section G101 is an input section for setting whether the XOR calculation function of the FMPK 144 can be used.

In the logical volume setting section G104, when the XOR calculation function of the FMPK 144 is set to be "enable" in the FMPK setting section G101, input can performed, and the set information is valid. The logical volume setting section G104 includes a logical volume ID setting column G105 and an FMPK XOR function setting column G106.

The logical volume ID setting column G105 displays a logical volume ID defined in the storage system 42. The XOR function setting column G106 includes an input field for setting whether the XOR calculation function of the FMPK 144 associated with the logical volume displayed in the logical volume ID setting column G105 can be used. When "enable" of the XOR function setting column G106 is selected for a certain logical volume, the parity generation using the XOR calculation function of the FMPK 144 is performed at a time of the parity generation of the RAID group associated with the logical volume.

When the save button B10 is pressed, the set information input to the menu window G100 is transmitted to and stored in the storage system 42. Specifically, for the logical volume in which the "enable" of the XOR function setting column G106 is selected, a value of the XOR enable bit column 304 of the volume management table 300 is set to 1. When "disable" is selected, the value of the XOR enable bit column 304 is set to 0. When the cancel button B11 is pressed, contents input to the menu window G100 are discarded without being stored in the storage system 42, and the menu window G100 is closed.

FIG. 8 shows a schematic diagram of a host write processing according to a first embodiment. A flow of data and control in the storage system 42 according to the present embodiment will be described with reference to FIG. 8. The storage system 42 receives a write request of new data (new D) from the host computer 10 and stores the new data in the data FMPK 144. The storage system 42 generates a necessary new parity, stores the new parity in the parity FMPK 144, and returns a normal response to the host.

When receiving the write request from the host computer 10, the CPU 62 uses an FE I/F 52 to store write data (new D) 70 along with the write request in the memory 40 (80). Next, the CPU 62 sends a new data update command which specifies the LBA to the data FMPK 144, and transmits the new data 70 to the data FMPK 144.

After receiving the new data update command, the data FMPK 144 stores the new data 70 in the memory 1445, and allocates an FM area for storing the new data 70. The data FMPK 144 stores the physical address for the FM area in a cell of the NEW PA column 403 corresponding to the LBA requested by the CPU 62. The data FMPK 144 increments a value of the sequence number section 502. The data FMPK 144 uses an XOR circuit 1442 to generate an intermediate parity 72 which is an XOR value of old data 71 and the new data 70 indicated by the OLD PA column 402 (86).

The data FMPK 144 transmits the intermediate parity 72, a sequence number 75 and a new data update completion notification to the memory 40 (82), and writes new data in the FM area indicated by the NEW PA column 403. Since a general FMPK 144 includes a battery, the writing to the flash memory may be asynchronous with the processing of the new data update command.

Next, the CPU 62 sends a parity update command which specifies the LBA to the parity FMPK 144, and transmits the intermediate parity 72, the sequence number 75, and the data stripe number in the stripe group of the corresponding data to the parity FMPK 144 (83).

After receiving the parity update command, the parity FMPK 144 stores the intermediate parity 72 in the memory 1445. The parity FMPK 144 reads an address of an old parity 73 corresponding to the LBA requested by the CPU 62 from the OLD PA column 402, and reads the old parity 73 from the FM area. The parity FMPK 144 uses the XOR circuit 1442 to generate a new parity 74 which is an XOR value of the old parity 73 and the intermediate parity 72 (87).

Further, the parity FMPK 144 allocates the FM area for storing the new parity 74, and stores the physical address for the FM area in the OLD PA column 402. The parity FMPK 144 stores the sequence number 75 in a cell corresponding to the LBA and the data stripe number in the stripe group specified by the CPU 62 in the section 502 of the sequence number management table 500.

The parity FMPK 144 transmits a new parity update completion notification to the memory 40, and writes the new parity 74 in the FM area indicated by the OLD PA 402. Since the general FMPK 144 includes a battery, the writing to the FM area may be asynchronous with the processing of the parity update command.

After confirming the new parity update completion, the CPU 62 reports a write processing completion (normal ending) to the host computer 10 (84). Thereafter, the CPU 62 transmits a new data determination command to the data FMPK 144 (85).

After receiving the new data determination command, the CPU 1444 of the FMPK 144 copies the physical address stored in the NEW PA column 403 to the OLD PA column 402, and updates a value of the NEW PA column 403 to an invalid value (NULL value). The CPU 1444 transmits a new data determination command completion notification to the memory 40. The CPU 62 confirms completion of the new data determination command, and the host write processing is completed.

FIGS. 9A, 9B, and 9C show flowcharts of the host write processing executed by the CPU 62 according to the present embodiment. As shown in FIG. 9A, first, the CPU 62 receives the write request from the host computer 10 (S2110). Next, the CPU 62 allocates a temporary storage area for storing the new data, the intermediate parity, and the sequence number, on the memory 40 connected to the CPU 62 (S2120), and transmits a write preparation completion notification to the host computer 10 (S2130). The temporary storage area is an area storing redundant and unnecessary data, and the data therein is not copied to the memory 40 of another storage controller 30.

In response to the write preparation completion notification, the host computer 10 starts transmitting the new write data 70. When the data transmission from the host computer 10 to the temporary storage area in the memory 40 of the new write data 70 is completed, the CPU 62 receives a data transmission completion notification from the host computer 10 via the FE I/F 52 (S2140).

When receiving the data transmission completion notification, the CPU 62 transmits a new data update command to the data FMPK 144 to store the new data 70 (S2150). The new data update command specifies an address of the memory 40 storing the new data, a logical address (LBA) of a logical address space where the data FMPK 144 transmitting the new data is shown to the CPU 62, and a data length. The new data update command further specifies addresses of the memory 40 for storing the intermediate parity and the sequence number respectively.

After receiving the new data update command, the CPU 1444 of the data FMPK 144 refers to a record of the specified LBA in the logical address management information table 400, and determines whether both of new data and the data of the previous write processing are held. When the value of the NEW PA column 403 is an invalid value, the data update of the previous write processing (including the parity update in the stripe group) is completed. When the NEW PA column 403 indicates an address, the data update of the previous write processing is not completed, and both of the new data and the old data of the previous write processing are held in the data FMPK 144.

When the data update of the previous write processing is completed, the CPU 1444 stores the new data 70 in the memory 1445, and allocates a physical area for storing the new data 70 in the FM 1443. The CPU 1444 stores the physical address for the allocated physical area in a cell of the NEW PA column 403 corresponding to the LBA requested by the CPU 62, and increments a value of a corresponding cell in the sequence number section 502.

The CPU 1444 uses the XOR circuit 1442 to generate the intermediate parity 72 which is the XOR value of the old data 71 and the new data 70 indicated by the OLD PA column 402 (86), and stores the intermediate parity 72, the sequence number 75, and the new data update completion notification in the specified address of the memory 40 (82). The CPU 62 receives the new data update completion notification via the memory 40 (S2160). Thereafter, the CPU 144 of the FMPK 144 writes the new data 70 in the FM area indicated by the NEW PA column 402.

When the data update of the previous write processing is not completed and both of the new data and the old data of the previous write processing are held, the CPU 1444 of the data FMPK 144 stores a response indicating that both of the old and the new data are held in the memory 40 of the storage controller 30 together with a current sequence number. With reference to the response from the data FMPK 144, the CPU 62 determines whether both of the new data and the old data of the previous write processing are held (S2300). When the old data and the new data are not held (S2300: NO), the CPU 62 transmits a parity update command to the parity FMPK 144 (S2170). The parity update command specifies the address of the memory 40 storing the intermediate parity, the logical address (LBA) of the logical address space where the FMPK 144 transmitting the intermediate parity is shown to the CPU 62, the data length, the sequence number, and a number in the stripe group.

After receiving the parity update command, the CPU 1444 of the parity FMPK 144 stores the intermediate parity 72 in the memory 1445, and reads a pointer of the old parity 73 corresponding to the LBA requested by the CPU 62 from the OLD PA column 402. The CPU 1444 uses the XOR circuit 1442 to generate the new parity 74 which is the XOR value of the old parity 73 and the intermediate parity 72 (87).

The CPU 1444 allocates the physical area storing the new parity 74 in the FM 1443. The CPU 1444 stores the physical address for the physical area in the OLD PA column 402, and stores the sequence number 75 in the cell corresponding to the LBA and the data stripe number in the stripe Group transmitted from the CPU 62 in the section 502 of the sequence number management table 500. The CPU 1444 transmits the new parity update completion notification to the memory 40.

As shown in FIG. 9B, the CPU 62 receives a parity update command completion notification from the parity FMPK 144 via the memory 40. (S2180). Thereafter, the CPU 1444 of the parity FMPK 144 writes the new parity 74 in the FM area indicated by the OLD PA column 402.

When receiving a new parity update completion notification, the CPU 62 transmits a write completion notification which indicates the normal ending of the process to the host computer 10 (S2190). Thereafter, the CPU 62 releases the temporary storage area of the memory 40 temporarily storing the new data and the like (S2200).

Next, the CPU 62 transmits a new data determination command to the data FMPK 144 holding the new data 70 (S2210). The new data determination command specifies the logical address (LBA) of the logical address space where the data FMPK 144 is shown to the CPU 62, and the data length. It is not necessary to transmit the new data determination command to the parity FMPK 144.

After receiving the new data determination command, the CPU 1444 of the data FMPK 144 copies the physical address stored in the NEW PA column 403 to the OLD PA column 402, and updates the value of the NEW PA column 403 to an invalid value.

The CPU 1444 transmits a new data confirmation completion notification to the memory 40. The completion of the new data determination is notified to the CPU 62 (S2220). The CPU 62 confirms the completion of the new data determination, and the host write processing is completed. The completion of the host write processing can be appropriately managed by updating the logical address management information table 400 of the data FMPK with the new data determination command after the parity update, and by completing the write processing.

Referring back to FIG. 9A, in step S2300, when both of the new data and the old data are held in the data FMPK 144 (S2300: YES), the CPU 62 specifies the LBA of the new data and the data stripe number in the stripe group, and inquires the parity FMPK 144 about the sequence number (S2310). The CPU 62 acquires the sequence number from the parity FMPK 144 (S2320).

The CPU 62 compares the sequence number acquired from the data FMPK 144 with the sequence number acquired from the parity FMPK 144 (S2300). When the two sequence numbers do not match, the CPU 62 proceeds to step S2400. When the two sequence numbers match, the CPU 62 proceeds to step S2500.

As shown in FIG. 9C, in step S2400, the CPU 62 specifies the LBA and the data length, and transmits an intermediate parity read command to the data FMPK 144. The intermediate parity read command further specifies the address of the memory 40 for storing the intermediate parity and the sequence number respectively.

The CPU 62 receives the intermediate parity together with an intermediate parity read completion from the data FMPK 144 via the memory 40 (S2410). The CPU 62 transmits a parity update command to the parity FMPK 144 (S2420). Steps S2420, S2430, S2500, and S2510 are the same as the steps S2170, S2180, S2210, and S2220, respectively, so the details are omitted. After the step S2510, the CPU 62 returns to the step S2150.

As described above, by checking whether the FMPK holds the new data and the old data (whether the new data is undefined), the storage controller can determine whether the previous write processing for the same address is completed or is interrupted (for example, due to a failure of the storage controller).

When a response from the data FMPK indicates that the previous write processing is not completed, by comparing the sequence number of the data FMPK with the sequence number of the parity FMPK, the storage controller can determine whether the parity data corresponding to the new data of the previous write processing of the data FMPK is stored in the parity FMPK.

As described above, by comparing the sequence number of the data FMPK with the sequence number of the parity FMPK, a time point when the write processing is interrupted can be specified, and the write processing can be resumed from an appropriate step. The match between the sequence numbers indicates that the data of the data FMPK matches the parity data of the parity FMPK. The mismatch between the sequence numbers indicates that the data of the data FMPK and the parity data of the parity FMPK do not match.

As described above, when the previous write processing not completed, the storage controller resumes the previous write processing from the interrupted step, and then executes a current (new) write processing after the previous write processing is completed. Accordingly, a mismatch between the host data and the parity data can be avoided.

FIG. 10 shows a flowchart of a read processing from the FMPK 144. Appropriate data can be read from the FMPK 144 by the read processing described below. The CPU 1444 of the FMPK 144 receives a read command which specifies the LBA and the data length from the storage controller 30 (S5110). The CPU 1444 allocates the temporary storage area in the memory 1445 (S5120).

The CPU 1444 acquires the physical address of the specified LBA from the logical address management information table 400 (S5130). When the NEW PA column 403 of the record of the specified LBA stores the physical address, the CPU 1444 acquires the physical address from the NEW PA column 402. When the NEW PA column 403 stores an invalid value, the CPU 1444 acquires the physical address from the OLD PA column 402.

The CPU 1444 stores the data read from the acquired physical address in the temporary storage area (S5140). Thereafter, the CPU 1444 transmits the read data and a read completion notification to the storage controller 30 (S5150).

As described above, the storage controller responds to the new data when both of the new data and the old data are present, and responds to the old data when only the old data is present. Accordingly, in the read processing after the occurrence of a failure during the write processing, the host computer can be avoided from responding to the old data after a response to the write completion notification, and the reliability and availability of the storage system are maintained.

Further, when the old data and the new data are held, the FMPK 144 notifies the storage controller 30 of a holding state of the old data and the new data. After the storage controller 30 performs the steps S2310, S2320, S2330, S2400, S2410, S2420, S2430, S2500, and S2510, the new data is responded to the host. Accordingly, since the new data is also reflected in the parity FMPK 144, it is possible to avoid responding to the old data even when the data FMPK 144 after the new data response fails.

In a collection processing corresponding to the occurrence of the failure of the FMPK in the RAID group, the parity data is read from the parity FMPK. In the collection processing, the storage controller reads data from a normal data FMPK. Accordingly, it can be determined whether the previous write processing is completed. The storage controller reads the parity data from the parity FMPK after the completion of the previous write processing. Accordingly, even when a drive failure occurs, the reliability and availability of the storage system are maintained without responding to an unauthorized data.

According to the present embodiment, it is possible to reduce the processing load of the storage controller relating to the parity generation and data storage processing to a storage medium while maintaining the reliability and availability of the storage system, thereby improving the write performance.

As described above, the parity generation by the storage controller and duplication of the parity data are not necessary due to the parity generation by the FMPK. Further, due to the sequence number, each of the data FMPK and the parity FMPK has the management information for a write data update and a parity data update, and the failure can be appropriately coped with. Accordingly, it is unnecessary for the storage controller to hold the management information for the data update.

As described above, since a response to the new data update command includes the sequence number and the intermediate parity, a number of the commands sent from the storage controller to the data FMPK can be reduced. The storage controller may send a command to request the sequence number and/or the intermediate parity different from the new data update command.

In the present embodiment, after the parity update, the host computer is notified of the normal ending of the write processing. Accordingly, the redundancy of the write data is unnecessary. Alternatively, the write data may be made redundant to the CM on the memory of the storage controller, and the processing subsequent to the data update command may be executed after the normal response to the host. Even in that case, the processing of updating the FMPK by the storage controller is improved, and the write performance of the storage controller is improved.

Second Embodiment

FIG. 11 shows a schematic diagram of a host write processing according to a second embodiment. In the second embodiment, new data is transmitted in parallel to a data FMPK to store the new data and a parity FMPK to store a parity corresponding to the new data. Further, at a time point when a normal response is reported from both the FMPKs, the host computer 10 is notified of a normal ending of the write processing in the second embodiment.

Accordingly, it is possible to shorten the response time to the write request from the host computer 10 as compared with the first embodiment. Further, compared with the redundancy of the write data to the CM on the memory of the storage controller in the first embodiment, the processing of the storage controller is reduced, and the write performance of the storage controller is improved.

FIG. 11 shows a schematic diagram of the host write processing according to the second embodiment. With reference to FIG. 11, a flow of data and control in the storage system 42 according to the present embodiment will be described. The storage system 42 receives a write request of the new data (new D) from the host computer 10. The storage system 42 stores the new data in the data FMPK and the parity FMPK, and transmits a write completion notification to the host computer 10. The storage system 42 generates a necessary new parity, and stores the new parity in the parity FMPK.

When receiving the write request from the host computer 10, the CPU 62 uses the FE I/F 52 to store the write data (new D) 70 along with the write request in the memory 40 (680). Next, the CPU 62 sends a new data update command which specifies the LBA to the data FMPK 144, and transmits the new data 70 to the data FMPK 144 (681). The CPU 62 sends a new data storage command which specifies the LBA and a data number in a stripe group to the parity FMPK 144, and transmits the new data 70 to the parity FMPK 144 (682).

After receiving the new data update command, the data FMPK 144 stores the new data 70 in the memory 1445, increments a value of the sequence number section 502 of the specified LBA, and transmits a sequence number 76 and a new data update command reception notification to the memory 40 (683).

After receiving the new data storage command, the parity FMPK 144 stores the new data 70 in the memory 1445, records an address in the NEW PA column 403 of the LBA storing the parity, and transmits a new data storage completion notification to the memory 40. The parity FMPK 144 may allocate an FM area in a new data storage command processing in preparation for a power supply failure. Since the general FMPK 144 includes a battery, the parity FMPK 144 may operate by a power supply from the battery, allocate the FM area, and write the new data when the power supply failure occurs.

After receiving the new data update command reception notification and the new data storage completion notification, the CPU 62 transmits the write completion notification to the host computer 10 (684), and waits for a new data update completion notification from the data FMPK 144.

After transmitting the new data update command reception notification, the data FMMPK 144 allocates the FM area for storing the new data 70, and stores a physical address for the FM area in a cell of the NEW PA column 403 corresponding to the LBA requested by the CPU 62. The data FMPK 144 uses the XOR circuit 1442 to generate the intermediate parity 72 which is an XOR value of the old data 71 and the new data 70 indicated by the OLD PA column 402 (86).

The data FMPK 144 transmits the intermediate parity 72 and the new data update completion notification to the memory 40 (685), and writes the new data in the FM area indicated by the NEW PA column 403. Since the general FMPK 144 includes a battery, the writing to a flash memory may be asynchronous with the processing of the new data update command.

Next, after receiving the new data update completion notification, the CPU 62 sends a parity update command which specifies the LBA to the parity FMPK 144, and transmits the intermediate parity 72, the sequence number 75, and the data stripe number in the stripe group of corresponding data to the parity FMPK 144 (686).

After receiving the parity update command, the parity FMPK 144 stores the intermediate parity 72 in the memory 1445. The parity FMPK 144 reads the address of the old parity 73 corresponding to the LBA requested by the CPU 62 from the OLD PA column 402, and reads the old parity 73 from the FM area. The parity FMPK 144 uses the XOR circuit 1442 to generate a new parity 74 which is an XOR value of the old parity 73 and the intermediate parity 72 (87).

Further, the parity FMPK 144 allocates the FM area for storing the new parity 74, and stores the physical address for the FM area in the OLD PA column 402. The parity FMPK 144 is stored in a cell corresponding to the LBA and the data stripe number in the stripe group specified by the CPU 62 in the section 502 of the sequence number management table 500.

The parity FMPK 144 discards the new data received together with the new data storage command, transmits a new parity update completion notification to the memory 40, and writes the new parity 74 in the FM area indicated by the OLD PA column 402. Since the general FMPK 144 includes a battery, the writing to the FM area may be asynchronous with the processing of the parity update command.

After confirming the new parity update completion, the CPU 62 transmits a new data determination command to the data FMPK 144 (687). After receiving the new data determination command, the data FMPK 144 copies the physical address stored in the NEW PA column 403 to the OLD PA column 402, and updates a value of the NEW PA column 403 to an invalid value. The data FMPK 144 transmits a new data determination completion notification to the memory 40. The CPU 62 confirms the completion of the new data determination, and the write processing is completed.

FIGS. 12A, 12B, and 12C show flows of the host write processing executed by the CPU 62 according to the second embodiment. Steps S3110 to S3150 in FIG. 12A are the same as the steps S2110 to S2150 in FIG. 9A.

In step S3160, the CPU 62 receives a response to the new data update command from the data FMPK 144. The method of determining new data and old data by the data FMPK 144 is the same as that of the first embodiment. When the new data and the old data are present, the data FMPK 144 returns a response indicating that the new data and the old data are held together with a sequence number. When only the old data is present, the data FMPK 144 stores the new data 70 in the memory 1445, increments the value of the sequence number section 502, and transmits the sequence number and the new data update command reception notification to the memory 40 (683).

When the data FMPK 144 does not hold the new data and the old data (S3165: NO), the CPU 62 sends a new data storage command to the parity FMPK 144, and transmits the new data 70 to the parity FMPK 144 (S3170). The new data storage command specifies an address of the memory 40 storing the new data, a logical address (LBA) of logical address space where the parity FMPK 144 storing the parity corresponding to the new data is shown to the CPU 62, a data length, and the data stripe number in the stripe group.

After receiving the new data storage command, the parity FMPK 144 stores the new data 70 in the memory 1445, records the physical address in the NEW PA column 403 of the LBA storing the parity data, and transmits a new data storage completion notification to the memory 40 (S3180).

After receiving the new data update command reception notification and the new data storage completion notification, the CPU 62 transmits a write completion notification to the host computer 10 (S3190).

After transmitting the new data update command reception notification, the data FMPK 144 allocates the FM area for storing the new data 70, and stores the physical address for the FM area in the cell of the NEW PA column 403 corresponding to the LBA requested by the CPU 62. The data FMPK 144 uses the XOR circuit 1442 to generate the intermediate parity 72 which is the XOR value of the old data 71 and the new data 70 indicated by the OLD PA column 402 (86).

The data FMPK 144 transmits the intermediate parity 72 and a new data update completion notification to the memory 40 (685), and notifies the CPU 62 of the completion of the new data update (S3200). Thereafter, the data FMPK 144 writes the new data 70 in the FM area indicated by the NEW PA column 403.

After receiving the new data update completion notification, the CPU 62 transmits a parity update command to the parity FMPK 144 (S3210). The parity update command specifies the address of the memory 40 for storing the intermediate parity, the logical address (LBA) of the logical address space where the parity FMPK 144 is shown to the CPU 62, the data length, the sequence number, and the data stripe number in the stripe group.

After receiving the parity update command, the parity FMPK 144 stores the intermediate parity 72 in the memory 1445. The parity FMPK 144 reads the old parity 73 indicated by the cell of the OLD PA column 402 corresponding to the LBA requested by the CPU 62 from the FM area. The parity FMPK 144 uses the XOR circuit 1442 to generate a new parity 74 which is the XOR value of the old parity 73 and the intermediate parity 72 (87).

The parity FMPK 144 allocates the FM area for storing the new parity 74, and stores the physical address for the FM area in the OLD PA column 402. The parity FMPK 144 stores the sequence number 75 in the cell of the section 502 corresponding to the LBA and the data stripe number transmitted from the CPU 62 in the stripe group.

The parity FMPK 144 discards the received new data together with the new data storage command. The parity FMPK 144 transmits a new parity update completion notification to the memory 40, and notifies the CPU 62 of the completion of the new parity update (S3220). Thereafter, the parity FMPK 144 writes the new parity 74 to the allocated FM area.

When receiving the new parity update completion notification, the CPU 62 releases the temporary storage area of the memory 40 temporarily storing the new data (S3230), and transmits a new data determination command to the data FMPK 144 storing the new data 70 (S3240). The new data determination command specifies the logical address (LBA) of the logical address space where the data FMPK 144 is shown to the CPU 62, and the data length.

After receiving the new data determination command, the data FMPK 144 copies the physical address stored in the NEW PA column 403 to the OLD PA column 402, and updates the value of the NEW PA column 403 to an invalid value. The data FMPK 144 transmits a new data determination completion notification to the memory 40, which notifies the CPU 62 of the completion of the new data determination (S3250). The CPU 62 confirms the completion of the new data determination, and the write processing is completed.

In the step S3165, when the new data and the old data are held (S3165: YES), the CPU 62 proceeds to step 3500. Steps S3500, S3520, S3530, S3600, and S3610 in FIGS. 12B and 12C are the same as the steps S2310, S2320, S2330, S2400, and S2410 in FIGS. 9B and 9C. Steps S3620, S3630, S3700, and S3710 are the same as the steps S3210, S3220, S3240, and S3250.

Third Embodiment

FIG. 13 shows a schematic diagram of a host write processing according to a third embodiment. In the third embodiment, an XOR operation is performed not by an FMPK drive but by a storage controller. Accordingly, an XOR circuit can be omitted from the FMPK 144.

FIG. 13 shows the schematic diagram of the host write processing according to the third embodiment. With reference to FIG. 13, a flow of data and control in the storage system 42 according to the present embodiment will be described. The storage system 42 receives a write request of new data (new D) from the host computer 10, and stores the new data in the data FMPK 144. The storage system 42 generates a necessary new parity, stores the new parity in the parity FMPK 144, and makes a normal response to the host.

When receiving the write request from the host computer 10, the CPU 62 uses the FE I/F 52 to store the write data (new D) 70 along with the write request in the memory 40 (780). Next, the CPU 62 sends a new data update command which specifies an LBA to the data FMPK 144, and transmits the new data 70 to the data FMPK 144 (781).

After receiving the new data update command, the data FMPK 144 stores the new data 70 in the memory 1445, and allocates an FM area for storing the new data 70. The data FMPK 144 stores a physical address for the FM area in a cell of the NEW PA column 403 corresponding to the LBA requested by the CPU 62. The data FMPK 144 increments a value of the sequence number section 502 and reads the old data 71 indicated by the OLD PA column 402 from the FM area.

The data FMPK 144 transmits the old data 71, a sequence number 75 and a new data update completion notification to the memory 40 (782). The data FMPK 144 writes the new data in the allocated FM area. Since the general FMPK 144 includes a battery, the writing to the FM area may be asynchronous with the processing of the new data update command.

Next, the CPU 62 transmits a read command of old parity data to the parity FMPK 144, and the parity FMPK 144 returns the old parity 73 and a read completion notification to the memory 40 (783). After confirming the completion of read, the CPU 62 reads the new data 70, the old data 71 and the old parity 73 on the memory 40, calculates their XORs, generates a new parity 74, and stores the new parity 74 in the memory 40 (784).

Next, the CPU 62 sends a parity update command which specifies the LBA to the parity FMPK 144, and transmits the new parity 74, the sequence number 75, and a corresponding data stripe number in a stripe group (785).

After receiving the parity update command, the parity FMPK 144 stores the new parity 74 in the memory 1445. The parity FMPK 144 allocates the FM area for storing the new parity 74, and stores the physical address for the FM area in the OLD PA column 402.

The parity FMPK 144 stores the sequence number 75 in a cell of the sequence number section 502 corresponding to the LBA and the data stripe number transmitted from the CPU 62 in the stripe group. The parity FMPK 144 transmits a new parity update completion notification to the memory 40, and thereafter stores the new parity 74 in the allocated FM area. Since the general FMPK 144 includes a battery, the writing of the FM area may be asynchronous with the processing of the parity update command.

After confirming the completion of the new parity update, the CPU 62 reports a write completion to the host computer 10 (786). Thereafter, the CPU 62 transmits a new data determination command to the data FMPK 144 (787).

After receiving the new data determination command, the data FMPK 144 copies a physical address stored in the NEW PA column 403 to the OLD PA column 402, and updates a value of the NEW PA column 403 to an invalid value. The data FMPK 144 transmits a new data determination completion notification to the memory 40. The CPU 62 confirms the completion of the new data determination, and the write processing is completed.

FIGS. 14A, 14B, and 14C show flows of the host write processing executed by the CPU 62 according to the third embodiment. Steps S4110 to S4150 in FIG. 14A are the same as the steps S2110 to S2150 in FIG. 9A.

In step S4160, the CPU 62 receives a response to the new data update command from the data FMPK 144. The method of determining the new data and the old data by the data FMPK 144 is the same as that of the first embodiment. When the new data and the old data are present, the data FMPK 144 returns a response indicating that the new data and the old data are held together with a sequence number.

In step S4165, when only the old data is present (S4165: NO), the data FMPK 144 stores the new data 70 in the memory 1445, and allocates the FM area for storing the new data 70. The data FMPK 144 stores the physical address for the FM area in the cell of the NEW PA column 403 corresponding to the LBA requested by the CPU 62.

The data FMPK 144 increments a corresponding value of the sequence number section 502 and reads the old data 71 indicated by the OLD PA column 402 from the FM area. The data FMPK 144 transmits the old data 71, the sequence number 75, and a new data update completion notification to the memory 40 (782), which notifies the CPU 62 of the completion of the new data update (S4160). When receiving the new data update completion notification, the CPU 62 specifies the LBA and transmits a read command of an old parity to the parity FMPK 144 (S4170). The parity FMPK 144 returns the old parity 73 and a read completion notification to the memory 40 (S4180).

After receiving the read command completion notification, the CPU 62 reads the new data 70, the old data 71 and the old parity 73 on the memory 40, calculates their XORs, and generates a new parity 74. The CPU 62 stores the new parity 74 in a temporary storage area of the memory 40 (S4190).

Next, the CPU 62 transmits a parity update command to the parity FMPK 144 (S4200). The parity update command specifies an address of the memory 40 storing the new parity, a logical address (LBA) of logical address space where the parity FMPK 144 is shown to the CPU 62, a data length, a sequence number, and a data stripe number in the stripe group.

After receiving the parity update command, the parity FMPK 144 stores the new parity 74 in the memory 1445, and allocates the FM area for storing the new parity 74. The parity FMPK 144 stores the physical address for the FM area in the OLD PA column 402. The parity FMPK 144 stores the sequence number 75 in the cell of the sequence number section 502 corresponding to the LBA and the data stripe number transmitted from the CPU 62 in the stripe group.

The parity FMPK 144 transmits a new parity update completion notification to the memory 40, which notifies the CPU 62 of the completion of the new parity update (S4210). Thereafter, the parity FMPK 144 stores the new parity 74 in the allocated FM area.

When receiving the new parity update completion notification, the CPU 62 notifies the host computer 10 of the normal ending of the write processing (S4220), and releases the temporary storage area of the memory 40 temporarily storing the new data and the like (S4230).

Next, the CPU 62 transmits a new data determination command to the data FMPK 144 (S4240). The new data determination command specifies the logical address (LBA) of the logical address space where the data FMPK 144 is shown to the CPU 62, and the data length.

After receiving the new data determination command, the data FMPK 144 copies the physical address stored in the NEW PA column 403 to the OLD PA column 402, and updates the value of the NEW PA column 403 to an invalid value. The data FMPK 144 transmits a new data determination completion notification to the memory 40, which notifies the CPU 62 of the completion of the new data determination (S4250). The CPU 62 confirms the completion of the new data determination, and the write processing is completed.

In the step S4165, when the new data and the old data are held (S4165: YES), the CPU 62 proceeds to step 4500. Steps S4500, S4520, and S4530 in FIG. 14B are the same as the steps S2310, S2320, and S2330 in FIG. 9B. Steps S4600 to S4640, S4700 and S4710 in FIG. 14C are the same as the steps S4170 to S4270, S4240 and S4250 in FIG. 14A.

According to the present embodiment, the XOR circuit can be omitted from the FMPK 144. In the present embodiment, after the parity update, the host computer is notified of the normal ending of the write processing. Alternatively, the write data may be made redundant to a CM on a memory of the storage controller by a storage system, and the processing subsequent to a data update command may be executed after the normal response to the host.

Although the embodiments have been described above, these are examples for explaining the invention, and the invention is not limited to the above embodiments. The invention can be implemented in various other forms. For example, in the storage system described in the above embodiments, although each component is installed in a form of a package board, the invention is not limited thereto. The number of various package boards may be one or more. At least a part of the processing executed by the storage controller may be performed by the FMPK.

In the embodiments, a final storage device that stores the write data from the host computer is the FMPK using a flash memory. The final storage device is not limited to a storage drive using a flash memory, and a nonvolatile memory such as a PCM, a ReRAM, or other storage class memory, or a magnetic disk device such as a hard disk drive (HDD) may be used.

Although the above embodiments have mainly described an example of a RAID level 5, the invention can be applied to a system using other RAID levels or erasure coding. The invention can be applied to a distributed RAID system including a plurality of nodes each managing a local storage.

The invention can be applied to a computer system installed with a virtual machine in which the storage system and the host computer are executed on one or more computers. In one computer, when a host virtual machine and a storage virtual machine are installed, the same processor operates as the host and the storage controller.

Further, in the description of the embodiments, although a storage area of one RAID group is associated with one logical volume, the invention is not limited to this configuration. For example, a configuration may be adopted in which the storage area of one RAID group is divided into two or more continuous areas, and each divided continuous area is associated with one logical volume. Conversely, it is also possible to adopt a configuration in which one logical volume is associated with a plurality of the RAID groups.

Further, in the above description of the embodiments, the storage area of the logical volume provided to the host computer and the storage area of the RAID group are fixedly mapped. The invention is not limited to a configuration in which the relationship between the storage area of the logical volume and the storage area of the RAID group is fixed. For example, it is also possible to adopt a configuration in which the logical volume is defined using a Thin-Provisioning technique which is a well-known technique, and the storage area of the RAID group is allocated to the storage area only when the write request is received from the host computer to a logical volume upper storage area.

The invention is not limited to the above embodiments and includes various modifications. For example, the above embodiments have been described in detail in order to facilitate the understanding of the invention, but the invention is not necessarily limited to have all of the described configurations. A part of a configuration of one embodiment can be replaced with a configuration of another embodiment, and the configuration of another embodiment can also be added to the configuration of one embodiment. In a part of a configuration of each embodiment, another configuration can be added, removed, or replaced.

The above configurations, functions, processing units, or the like may be achieved by hardware by means of designing a part or all of them with, for example, an integrated circuit. The above-described configurations, functions, or the like may be achieved by software by means of interpreting and executing a program, by a processor, for achieving the respective functions. Information of programs, tables, files or the like for implementing each function can be placed in a recording device such as the memory, a hard disk, and a solid state drive (SSD), or a recording medium such as an IC card and an SD card.

Further, control lines and information lines show those considered to be necessary for the description, and not all the control lines and the information lines are necessarily shown on the product. In practice, almost all the configurations may be considered to be mutually connected.

The invention claimed is:
1. A storage system, comprising:
a plurality of storage drives; and
a controller,
wherein the controller receives, from a host, a first write request which specifies a first address and first new data associated with the first write request; and transmits a first data update command which specifies a second address and the first new data to a first storage drive included in the plurality of storage drives,
the first storage drive updates a managed sequence number of the second address in response to the first data update command; and transmits the updated sequence number to the controller,
the controller transmits a first redundant data update command which specifies a third address of old redundant data, data for updating the old redundant data, and the updated sequence number, to a second storage drive which stores the old redundant data associated with the second address and which is included in the plurality of storage drives, and
the second storage drive updates the old redundant data based on the data for updating the old redundant data; and updates the managed sequence number of the third address according to the updated sequence number,
wherein the controller
receives, from the first storage drive, information indicating whether processing of a previous write request for the first address is completed; and
when the processing of the previous write request is not completed, causes the first storage drive to execute processing of the first data update command after completing the processing of the previous write request.

2. The storage system according to claim 1,
wherein the first storage drive transmits intermediate redundant data generated based on the first new data and old data of the second address to the controller, in which the data for updating the old redundant data is the intermediate redundant data; and
wherein the second storage drive generates new redundant data based on the old redundant data and the intermediate redundant data.

3. The storage system according to claim 1,
wherein the controller determines whether the data at the second address matches with the redundant data at the third address based on a comparison result between the sequence number of the second address and the sequence number of the third address; and
updates the redundant data so as to match the data at the second address when the data at the second address and the redundant data at the third address do not match.

4. The storage system according to claim 1,
wherein the controller returns a completion response to the first write request to the host after transmitting the data for updating the old redundant data to the second storage drive.

5. The storage system according to claim 1,
wherein, in order to complete the processing of the previous write request, the controller
receives the sequence number of the second address from the first storage drive;
receives the sequence number of the third address from the second storage drive;
compares the sequence number of the second address with the sequence number of the third address;
causes the first storage drive to determine new data of a previous data update command at the second address by causing the second storage drive to execute an update corresponding to a previous redundant data update command at the third address when the comparison result indicates a mismatch; and
causes the first storage drive to determine the new data of the previous data update command at the second address without causing the second storage drive to execute the update at the third address when the comparison result indicates a match.

6. The storage system according to claim 1,
wherein the controller transmits the first new data to the second storage drive before transmitting the first redundant data update command; and
returns a completion response to the first write request to the host after transmitting the first new data to the first storage drive and the second storage drive, and before transmitting the first redundant data update command.

7. The storage system according to claim 1,
wherein the controller
reads the old redundant data from the third address of the second storage drive; and
generates new redundant data based on the old redundant data and the first new data, in which the data for updating the old redundant data is the new redundant data.

8. A storage system, comprising:
a plurality of storage drives; and
a controller,
wherein the controller receives, from a host, a first write request which specifies a first address and first new data associated with the first write request;
and transmits a first data update command which specifies a second address and the first new data to a first storage drive included in the plurality of storage drives,
the first storage drive updates a managed sequence number of the second address in response to the first data update command; and transmits the updated sequence number to the controller,
the controller transmits a first redundant data update command which specifies a third address of old redundant data, data for updating the old redundant data, and the updated sequence number, to a second storage drive which stores the old redundant data associated with the second address and which is included in the plurality of storage drives, and
the second storage drive updates the old redundant data based on the data for updating the old redundant data; and updates the managed sequence number of the third address according to the updated sequence number,
wherein the first storage drive transmits intermediate redundant data venerated based on the first new data and old data of the second address to the controller, in which the data for updating the old redundant data is the intermediate redundant data,
wherein the second storage drive generates new redundant data based on the old redundant data and the intermediate redundant data, and
wherein the first storage drive returns the intermediate redundant data and the updated sequence number to the controller in response to the first data update command.

9. A storage system, comprising:
a plurality of storage drives; and
a controller,
wherein the controller receives, from a host, a first write request which specifies a first address and first new data associated with the first write request; and transmits a first data update command which specifies a second address and the first new data to a first storage drive included in the plurality of storage drives,
the first storage drive updates a managed sequence number of the second address in response to the first data update command; and transmits the updated sequence number to the controller,
the controller transmits a first redundant data update command which specifies a third address of old redundant data, data for updating the old redundant data, and the updated sequence number, to a second storage drive which stores the old redundant data associated with the second address and which is included in the plurality of storage drives, and
the second storage drive updates the old redundant data based on the data for updating the old redundant data; and updates the managed sequence number of the third address according to the updated sequence number,
wherein the controller returns a completion response to the first write request to the host after transmitting the data for updating the old redundant data to the second storage drive, and
wherein the controller returns the completion response to the first write request to the host, receives a redundant data update completion notification of the third address from the second storage drive, and then transmits a new data determination command to the first storage drive, and
the first storage drive determines the first new data as data stored in the second address in response to the new data determination command.

* * * * *